(12) United States Patent
Laroia et al.

(10) Patent No.: US 6,985,498 B2
(45) Date of Patent: Jan. 10, 2006

(54) BEACON SIGNALING IN A WIRELESS SYSTEM

(75) Inventors: Rajiv Laroia, Basking Ridge, NJ (US); Frank A. Lane, Asbury, NJ (US); Junyi Li, Bedminster, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 10/641,399

(22) Filed: Aug. 13, 2003

(65) Prior Publication Data

US 2004/0095902 A1   May 20, 2004

Related U.S. Application Data

(60) Provisional application No. 60/406,076, filed on Aug. 26, 2002.

(51) Int. Cl.
H04J 4/00 (2006.01)

(52) U.S. Cl. .................................. 370/478; 370/430

(58) Field of Classification Search ............. 455/500, 455/507, 509, 513; 370/335, 337, 344, 430, 370/442, 480, 481, 482, 478, 527; 375/220–222
See application file for complete search history.

(56) References Cited

U.S. PATENT DOCUMENTS

| | | | |
|---|---|---|---|
| 5,355,367 A | 10/1994 | Comroe et al. | 370/329 |
| 5,410,538 A | 4/1995 | Roche et al. | 370/479 |
| 5,561,842 A | 10/1996 | Ritter et al. | 455/524 |
| 5,561,852 A | 10/1996 | Heeschen et al. | 455/509 |
| 5,570,352 A | 10/1996 | Poyhonen | 370/330 |
| 5,867,478 A | 2/1999 | Baum et al. | 455/417 |
| 5,911,120 A | 6/1999 | Jarett et al. | 370/203 |
| 6,005,856 A * | 12/1999 | Jensen et al. | 370/337 |
| 6,018,317 A | 1/2000 | Dogan et al. | 342/378 |
| 6,038,450 A | 3/2000 | Brink et al. | 455/442 |
| 6,064,692 A | 5/2000 | Chow | 375/219 |
| 6,078,571 A | 6/2000 | Hall | 370/331 |

(Continued)

FOREIGN PATENT DOCUMENTS

EP    0 833 456    4/1998

(Continued)

OTHER PUBLICATIONS

Chen, Hong et al., "An Orthogonal Projection-based Approach for PAR Reduction in OFDM," IEEE Communications Letters, May 2002. vol. 6, iss. 5, p. 169-171.*

(Continued)

*Primary Examiner*—John Pezzlo
*Assistant Examiner*—Donald L. Mills
(74) *Attorney, Agent, or Firm*—Straub & Pokotylo; Michael P. STraub

(57) ABSTRACT

A few high power tones used for synchronization and/or other purposes are transmitted in a FDM system during a period of time, e.g., a symbol transmission time period. During normal data transmission symbol periods signals are transmitted using at least 10 tones, e.g., per symbol time. Less than 5 high power signals are transmitted in a symbol time with at least 80% the maximum total transmitter power transmitted being allocated to the high power signals where the maximum total transmitter power is determined from a period of time which may includes one or more data and/or high power tone transmission periods. When the high power tones are transmitted at most 20% of transmitter power is available for transmitting other tones with the power normally being distributed among multiple tones. Normally some tones which would be transmitted in a symbol time go unused during transmission of the high power signals.

37 Claims, 14 Drawing Sheets

U.S. PATENT DOCUMENTS

| | | | |
|---|---|---|---|
| 6,078,823 A * | 6/2000 | Chavez et al. | 455/562.1 |
| 6,088,592 A | 7/2000 | Doner et al. | 455/447 |
| 6,118,805 A | 9/2000 | Bergstrom et al. | 375/132 |
| 6,161,000 A | 12/2000 | Yang et al. | 455/118 |
| 6,275,518 B1 | 8/2001 | Takahashi et al. | 375/135 |
| 6,377,566 B1 | 4/2002 | Cupo et al. | 370/343 |
| 6,377,636 B1 | 4/2002 | Paulraj et al. | 375/346 |
| 6,385,188 B1 | 5/2002 | Kim et al. | 370/342 |
| 6,400,704 B2 | 6/2002 | Mikuni et al. | 370/347 |
| 6,473,418 B1 | 10/2002 | Laroia et al. | 370/344 |
| 6,473,467 B1 | 10/2002 | Wallace et al. | 375/267 |
| 6,542,485 B1 | 4/2003 | Mujtaba | 370/335 |
| 6,587,526 B1 | 7/2003 | Li et al. | 370/355 |
| 6,647,006 B1 | 11/2003 | Szajnowski | 370/345 |
| 6,661,771 B1 | 12/2003 | Cupo et al. | 370/204 |
| 6,665,277 B1 * | 12/2003 | Sriram | 370/324 |
| 6,711,120 B1 | 3/2004 | Laroia et al. | 370/204 |
| 6,751,444 B1 | 6/2004 | Meiyappan | 455/69 |
| 6,810,254 B2 | 10/2004 | Tiedemann et al. | 455/437 |
| 2001/0043578 A1 | 11/2001 | Kumar et al. | 370/331 |
| 2002/0019228 A1 | 2/2002 | McKenna et al. | 455/435.1 |
| 2002/0045451 A1 | 4/2002 | Hwang et al. | 455/442 |
| 2002/0067774 A1 * | 6/2002 | Razoumov et al. | 375/316 |
| 2002/0086708 A1 | 7/2002 | Teo et al. | 455/561 |
| 2002/0122383 A1 | 9/2002 | Wu et al. | 370/210 |
| 2002/0154705 A1 | 10/2002 | Walton et al. | 375/267 |
| 2003/0114127 A1 | 6/2003 | Baldwin | 455/245.1 |
| 2003/0194029 A1 | 10/2003 | Heinonen et al. | 375/345 |
| 2004/0233871 A1 | 11/2004 | Seki et al. | 370/331 |

FOREIGN PATENT DOCUMENTS

| | | |
|---|---|---|
| EP | 1043861 | 10/2000 |
| EP | 1148673 | 10/2001 |
| WO | WO 97/26742 | 7/1997 |
| WO | WO 98/59450 | 12/1998 |

OTHER PUBLICATIONS

Chan-Soo, Hwang, "A Peak Power Reduction Method for Multicarrier Transmission," IEEE International Conference on Communications, Jun. 11-14, 2001. vol. 5, p. 1496-1500.*

Wang C.C., et al., "Dynamic Channel Resource Allocation in Frequency Hopped Wireless Communication Systems," Information Theory, 1994, Proceedings., 1994 IEEE International Symposium on Trondheim, Norway 26, Jun. and Jul. 1994, New York, NY, USA, IEEE.

Fazel, K., et al., "A Flexible and High Peformance Cellular Mobile Communications System Based on Orthogonal Multi-Carrier SSMA," Wireless Personal Communications, Kluwer Academic Publishers, NK, vol. 2, No. 1/2, 1995, pp. 121-144.

G.J. Pottie and A.R. Calderbank, "Channel Coding Strategies for Cellular Radio," pp. 763-770 of IEEE Transactions on Vehicular Technology, vol. 44, No. 4 (Nov. 1995).

Aue, Fettweis, "Multi-carrier spread spectrum modulation with reduced dynamic range," IEEE Vehicular Technology Conference (Apr. 28, 1996-May 4, 1996), pp. 914-917.

Iida, Marubayashi, "Multi-tone combinatory frequency hopping system," IEEE International Symposium on Spread Spectrum Techniques and Applications, Sep. 22-25, 1996, pp. 893-897.

Tufvesson F. et al., "Pilot Assisted Channel Estimation For OFDM in Mobile Cellular Systems," 1997 IEEE 47$^{th}$ Vehicular Technology Conference, Phoenix, May 4-7, 1997, IEEE Vehicular Technology Conference, New York, IEEE, US, vol. 3, Conf. 47.

R. Negi, et al., "Pilot Tone Selection for Channel Estimation in a Mobile OFDM System," IEEE Transactions on Consumer Electronics, pp. 1122-1128, 1998.

Reimers U., "Digital Video Broadcasing," IEEE Communications Magazing, IEEE Service Center, Piscataway, NJ, US, vol. 36, No. 6, Jun. 1, 1998, pp. 104-110.

Fernandez-Getino Garcia J., et al, "Efficient Pilot Patterns for Channel Estimation in OFDM Systems Over HF Channels," VTC 1999-Fall. IEEE VTS 50$^{th}$, Vechicular Technology Conference, Gateway to the 21$^{st}$ Century Communications Village, Amsterdam, Sep. 19-22, 1999, IEEE Vehicular Technology Conference, New York, NY, IEEE, US, vol. 4, Conf. 50, pp. 2193-2197.

Han, D.S. et al., "On the Synchronization of MC-CDMA System for Indoor Wireless Communications," VIC 1999-Fall. IEEE VTS 50$^{th}$, Vehicular Technology Conference, Gateway to the 21$^{th}$ Century Communications Village, Amsterdam, Sep. 19-22, 1999, IEEE Vehicular Technology Conference, New York, NY, IEEE, US, vol. 2, Conf. 50, pp. 693-697.

* cited by examiner

BEACON SIGNALING IN A WIRELESS SYSTEM

RELATED APPLICATIONS

The present invention claims the benefit of U.S. Provisional Patent No. 60/406,076 filed Aug. 26, 2002.

BACKGROUND OF THE INVENTION

Spread spectrum OFDM (orthogonal frequency division multiplexing) multiple access, is one example of a spectrally efficient wireless communications technology. OFDM can be used to provide wireless communication services.

In OFDM spread spectrum system, the total spectral bandwidth is normally divided into a number of orthogonal tones, e.g. subcarrier frequencies. In a cellular network, the same bandwidth is often reused in all the cells of the system. Those tones hop across the bandwidth for the purpose of channel (frequency) diversity and interference averaging. Tone hopping follows predefined tone hopping sequences so that the hopped tones of a given cell do not collide with each other. The tone hopping sequences used in neighboring cells could be different to average interference between cells.

One exemplary form of the tone hopping sequences, is $$F_j(t) = \frac{SLOPE}{\left\{\frac{1}{j} \mod N + t\right\}} \mod N \quad (1)$$

In the above equation, N is the total number of the tones, t is the OFDM symbol index, j is the index of a tone hopping sequence, j=0, ..., N−1, and $F_j(t)$ is the index of the tone occupied by the j-th tone hopping sequence at time t. SLOPE is a cell specific parameter that uniquely determines the tone hopping sequences used in a given cell. Neighboring cells could use different values of SLOPE.

Information (control and data) is transported via various physical channels. A physical channel corresponds to one or more tone hopping sequences defined in Equation (1). Therefore, those tone hopping sequences are sometimes referred to as data tone hopping sequences. In a physical channel, the basic transmission unit is a channel segment. A channel segment includes the tones corresponding to the data tone hopping sequence(s) of the data channel over some time interval usually corresponding to a number of OFDM symbols.

In addition to the data tone hopping sequences, the OFDM spread spectrum system may also use a pilot in a downlink to facilitate various operations, such operations may include synchronization and channel estimation. A pilot normally corresponds to one or more pilot tone hopping sequences. One exemplary form of a pilot tone hopping sequence, as disclosed in U.S. patent application Ser. No. 09/551,791, is $$Pilot_j(t) = SLOPE \cdot t + O_j \mod N \quad (2)$$

By using different values for SLOPE, different pilot sequences will occur. Different pilot sequences may be used in different cells.

In the above equation, N, t, and SLOPE are the same parameters as used in Equation (1), j is the index of a pilot tone hopping sequence, $Pilot_j(t)$ is the index of the tone occupied by the j-th pilot tone hopping sequence at time t, and $O_j$ is a fixed offset number of the j-th pilot tone hopping sequence. Normally, the cells in a system use the same set of offsets $\{O_j\}$.

In the OFDM spread spectrum system, the pilot and data tone hopping sequences are normally periodic with the same periodicity and use the same value for parameter SLOPE. The time interval of one period of a tone hopping sequence is sometimes referred to as a super slot. Thus, a super slot corresponds to a period after which a pilot sequence will repeat. The structures of the pilot, physical channels, and channel segments generally repeat from one super slot to another, and therefore can be uniquely determined once the super slot boundaries have been identified.

FIG. 1 shows a frequency vs time graph 100 used to illustrate general concepts of data and pilot tone hopping sequences, control and data traffic channels, channel segments, and super slots.

FIG. 1 includes a first row 102, a second row 104, a third row 106, a fourth row 108, and a fifth row 110. Each row 102, 104, 106, 108, 110 corresponds to a different orthogonal frequency tone in the frequency domain.

FIG. 1 also includes a first column 112, a second column 114, a third column 116, a fourth column 118, a fifth column 120 a sixth column 122, a seventh column 124, an eighth column 126, a ninth column 128, and a tenth column 130. Each column 112, 114, 116, 118, 120, 122, 124, 126, 128, 130 corresponds to an OFDM symbol time in the time domain.

In the FIG. 1 example, super slots 133, 135 each have a period equal to the period of the tone hopping sequence. First super slot 133 has a period of five OFDM symbol times represented by first through fifth columns 112, 114, 116, 118, 120 and defined by vertical time domain boundary lines 111 and 121. Second super slot 135 also has a period of five OFDM symbol times. Super slot 135 corresponds to sixth through tenth columns 122, 124, 126, 128, 130 and is defined by vertical time domain boundary lines 121 and 131.

During the first super slot (columns 112, 114, 116, 118, 120), data tone hopping sequences are shown for a first traffic segment. Three tones are dedicated to the first traffic segment during each symbol period. The data tone hopping sequence for the first exemplary traffic channel segment is illustrated by diagonal line shading which descends in FIG. 1 from left to right. During the second super slot (columns 122, 124, 126, 128, 130), data tone hopping sequences are shown for a second traffic segment. The data tone hopping sequence repeats in each super slot 133, 135. The data tone hopping sequence for the second exemplary traffic channel segment is illustrated by ascending diagonal line shading in FIG. 1. During the OFDM time intervals represented by first column 112 and the sixth column 122, the traffic channel data is shown to include frequency tones represented by first row 102, second row 104 and third row 106. During the OFDM time intervals represented by second column 114 and the seventh column 124, the traffic channel data is shown to include frequency tones represented by first row 102, third row 106 and fifth row 110. During the OFDM time intervals represented by third column 116 and the eighth column 126, the traffic channel data is shown to include frequency tones represented by second row 104, fourth row 108 and fifth row 110. During the OFDM time intervals represented by fourth column 118 and the ninth column 128, the traffic channel data is shown to include frequency tones represented by first row 102, third row 106 and fourth row 108. During the OFDM time intervals represented by fifth column 120 and the tenth column 130, the traffic channel data is shown to include frequency tones represented by second row 104, third row 106 and fourth row 108.

FIG. 1 also shows a pilot tone hopping sequence. The pilot tone hopping sequence repeats in each super slot 133, 135. The pilot tone hopping sequence is illustrated in FIG. 1 by use of small horizontal line shading. During the OFDM time intervals represented by first column 112 and the sixth column 122, the pilot tone is assigned to the frequency tone represented by fifth row 110. During the OFDM time intervals represented by second column 114 and the seventh column 124, the pilot tone is assigned to the frequency tone represented by fourth row 108. During the OFDM time intervals represented by third column 116 and the eighth column 126, the pilot tone is assigned to the frequency tone represented by third row 106. During the OFDM time intervals represented by fourth column 118 and the ninth column 128, the pilot tone is assigned to the frequency tone represented by the second row 104. During the OFDM time intervals represented by fifth column 120 and the tenth column 130, the pilot tone is assigned to the frequency tone represented by the first row 102.

In some OFDM spread spectrum systems, the traffic channel is assigned in a segment-by-segment manner. Specifically, traffic channel segments can be independently assigned to different wireless terminals. A scheduler determines the amount of transmission power and the burst data rate, associated with a particular channel coding and modulation scheme, to be used in each traffic channel segment. The transmission powers and burst data rates of different traffic channel segments may be different.

Sectorization is a popular method to improve wireless system capacity. For example, FIG. 2 illustrates a cell 200 including three sectors: sector 1 201, sector 2 203, and sector 3 205. Cell 200 also includes a base station 207 employing a 3-sector antenna including antenna sector 1 209, antenna sector 2 211, and antenna sector 3 213. The sectorized antenna provides some isolation between the sectors 201, 203, 205. In an ideal system, the same spectrum can be reused in all the sectors 201, 203, 205 without interfering with each other, thereby tripling the system capacity (over an omni cell) in the 3-sector system shown in FIG. 2. Unfortunately, ideal signal separation is not possible in the real world, which generally complicates the use of sectorization in some systems.

In theory, integrating the sectorization into an OFDM spread spectrum system should improve the overall system performance. However interference between the sectors due to the limited antenna isolation and reflection from objects can limit the actual capacity gains over an omni cell. Accordingly, it can be appreciated that there is a need for methods and apparatus which will allow sectorization to be used in OFDM systems in a manner that will improve the capacity of such systems without many of the interference problems associated with sectorization.

SUMMARY OF THE INVENTION

In accordance with the invention, the same spectrum, e.g., frequencies, may be reused in each of a cell's sectors in a sectorized FDM system. In some embodiments of the invention, the sectors of a cell are synchronized in terms of tone frequencies, OFDM symbol timing, data tone hopping sequences, channel segments and super slot boundaries. Synchronization of fewer transmission characteristics or parameters is used in some embodiments. In fact, some features of the invention such as beacon signals discussed below may be used with minimal or no frequency synchronization between sectors of a cell.

In various embodiments symbol timing between sectors of a cell is substantially synchronized, e.g., the symbol transmission start times are synchronized to within the time duration of a cyclic prefix included in transmitted symbols. As is know in the art, it is common to add a cyclic prefix, e.g., a copy of a portion of the symbol so that the same data is at both ends of the transmitted symbol. Cyclic prefixes provide some protection against timing errors and can be used as a buffer in terms of amount of acceptable timing differences which may occur between sectors.

Different cells in the system may, but need not, be synchronized in regard to transmission characteristics such as frequency. In the synchronized sector embodiment, for any control or data traffic channel in a given sector, there is a corresponding control or data traffic channel in each of the other synchronized sectors of the same cell. The corresponding channels in the different sectors will have the same configuration of frequency tones and time intervals, e.g., transmission frequencies and symbol transmission times. Channels are divided into segments for transmission purposes. Thus, corresponding channels will have corresponding channel segments. Because of the high level of synchronization between the sectors in the fully synchronized sector embodiment, inter-sector interference is concentrated between corresponding channel segments in such an embodiment. Non-corresponding channel segments see comparatively little inter-sector interference between each other.

In some embodiments, the pilots used in each of the sectors of a cell have the same value of SLOPE, but different offsets. This results in the repeating sequence of pilot tones being the same in each sector, but the starting point of the sequence being different in terms of time. Thus, at any point in time, the pilots in different sectors of a cell may be different.

When the sectorized OFDM spread spectrum system is used in a cellular network, in accordance with the invention, neighboring cells may use different values of SLOPE to determine the pilot and channel tone hopping sequences. The slope offset sets may be the same in different cells. Different cells need not, and are not necessarily synchronized, in terms of tone frequencies, OFDM symbol timing, tone hopping sequences, channel segments or super slot boundaries.

In accordance with one feature of the invention, in some embodiments, the transmission power allocated to corresponding channel segments of different sectors of a cell, if active, are substantially the same in each of the sectors. In such a case, the difference between the transmission powers for the corresponding active channel segments in the sectors of a cell are no more than Delta, where Delta is a value used to control channel power differences between sectors. Different Deltas may be used for different channels. In one embodiment, for at least one channel, Delta is set to be a constant, for example, zero. In another embodiment, Delta may be different from one group of corresponding channels to another, from one group of corresponding channel segments to another, or as a function of burst data rates used in corresponding channel segments or some other criteria. A scheduler may be used to coordinate the power allocation in the various sectors of a cell in a centralized manner. In accordance with the invention, the dynamic range of the allocated power between the traffic channels in the same sector may be large, while the dynamic range of the allocated power across corresponding traffic channels in the various sectors is limited. In some embodiments, the difference between corresponding channels of different sectors is kept to under less than 3 dB relative power difference for channel segments which are actively used in each of a cells sectors.

In order to facilitate differentiation of the signals corresponding to channel segments of different sectors, distinct scrambling bit sequences may, and sometimes are, used in different sectors when generating transmit signals in the respective sectors. The wireless terminal receiver may use a particular scrambling bit sequence to selectively demodulate the signal from an intended sector transmission of a base station. Alternatively, the wireless terminal receiver may use multiple scrambling bit sequences to demodulate the signals from multiple sector transmissions of a base station or from multiple base stations simultaneously.

The channel condition of a wireless terminal may be described in terms of being in one of two characteristic regions. In the first region, the SIR is not limited by inter-sector interference. When in the first region, the base station can increase the received SIR by allocating high transmission power and thereby provide an improved SIR. In the second region, the SIR is limited by the inter-sector interference, in which case, allocating high transmission power may not remarkably increase the received SIR since inter-sector interference will increase as channel power is uniformly increased in the corresponding channel of each sector.

In some embodiments, the wireless terminal estimates its channel condition characteristics and notifies the base station, such that the base station can make sensible scheduling decisions in terms of power and burst data rate allocation. The channel condition information may include information distinguishing between inter-sector interference and other interference. In accordance with the invention, the base station's scheduler may use the reported channel condition characteristics of the wireless terminals including power information, signal strength, and SIR to match wireless terminals to appropriate channels in each sector. Decisions on providing additional power or allocating segments for a wireless terminal to a channel having high power can be made based on the indication of inter-sector interference relative to other interference. In this manner, wireless terminals which can benefit from higher transmission power, e.g., those subject to low inter-sector interference, can be allocated to high power channels in a preferential manner over wireless terminals subject to comparatively high inter-sector interference. Assignment of high power channel segments can be used to load balance the system, improve or optimize system performance and/or increase throughput capability by evaluating and reducing inter-sector and inter-cell interference.

In accordance with one embodiment of the invention, if a wireless terminal is operating within a sector's cell boundary region and assigned a channel segment, the cell's scheduler may leave the tones corresponding to the channel segment in the sector adjacent the boundary region unassigned to reduce or eliminate the inter-sector interference. In accordance with the invention, sectorization isolation between wireless terminals in non-sector boundary areas may be managed by the scheduler's selective assignment of channel segments corresponding to channels with different power levels to different wireless terminals. Low power channels segments are normally assigned to wireless terminals near the transmitter while high power channels segments are assigned to wireless terminals far from the base station. The number of low power channels in a sector normally exceeds the number of high power channels with, in many cases, more of the sector's total transmission power being allocated to the relatively few high power channels than the large number of low power channels.

The base station may frequently and/or periodically transmit a beacon signal, e.g., a relatively high power signal on one or a few tones, over a period of time, e.g., one symbol period. Transmission power is concentrated on one or a small number of tones, e.g., the tones of the beacon signal, during the beacon transmission. This high concentration of power may involve allocating 80% or more of a sector's total transmission power in the beacon tones. In one embodiment, the beacon signal is transmitted at a fixed OFDM symbol duration, for example, the first or the last OFDM symbol, of a super slot and may repeat every super slot or every few super slots. In such a case, beacon signals are used to indicate superslot boundaries. Therefore, once the time position of the beacon signal has been located, the super slot boundaries can be determined. In accordance with the invention, beacon signals may be assigned to perform different tasks, e.g., convey different types of information. Beacons may be assigned to use fixed predefined frequencies, the frequency itself may convey information, such as, e.g., boundaries of a frequency band or the frequency may correspond to an index number, such as e.g., sector index number. Other beacons may be assigned multiple or varying frequencies which may be related to an index number or numbers used to convey information, such as, a slope value used to determine the hopping sequence of the cell into which the beacon is transmitted. The set of tones that carry high power in the beacon signal may be selected from a predefined group of beacon tone sets depending on the information to be conveyed. Use of different beacon tone sets in the beacon signal can indicate certain system information, such as the values of SLOPE, boundaries of the frequency band, and sector index.

In one embodiment of the invention, the type of beacon transmitted varies as a function of transmission time, e.g., alternates in the time domain. In another embodiment of the invention, the beacon frequency tone assignments may be reconfigured if a failure or problem occurs at a specific tone frequency. By utilizing both the time and frequency domain to vary the beacon signal transmissions and the information conveyed, a large amount of information may be conveyed to the mobiles in an efficient manner. This information may be used, e.g., to determine the sector/cell location of the mobile, offload some of the functions required by the pilot such as e.g. synchronization to superslot boundaries, reduce the time required for pilot punch through, evaluate reception strength, and provide useful information to predict and improve the efficiency of hand-offs between sectors and cells.

In accordance with the invention, in some embodiments, the frequency, symbol timing, and super slot structures of an uplink signal are slaved to those of the downlink signal, and are synchronized in the various sectors of a cell. In one embodiment, the data tone hopping sequences and channel segments are synchronized across each of the sectors of a cell. In another embodiment, the data tone hopping sequences and channel segments are randomized across each of the sectors of a cell such that a channel segment in one sector may interfere with multiple channel segments in another sector of the same cell.

One embodiment of the beacon features of the invention is directed to a method of operating a base station transmitter in a frequency division multiplexed communications system. The base station transmitter uses a set of N tones to communicate information over a first period of time using first signals, said first period of time being at least two seconds long, where N is larger than 10, and where the method includes transmitting during a second period of time a second signal including a set of X tones, where X is less than 5, and where at least 80% of a maximum average total base station transmission power used by said base station transmitter during any 1 second period during said first period of time is allocated to said set of X tones. The first period of time may be a large time interval, e.g., several minutes, hours or days. In some cases the first period of time is at least 30 minutes long. In particular implementations X is equal to one or two. The second period of time may be a period of time, e.g., a symbol transmission period in which a beacon signal is transmitted. In some cases during the second period of time at least half of the N-X tones which are in said set of N tones but not in said set of X tones go unused during said second period of time. In some implementations none of the N-X tones in said set of N tones but not in said set of X tones are used during said second period of time. In other implementations multiple ones of the N-X tones in said set of N tones but not in said set of X tones are used during said second period of time. The base station may be part of a communications system which is an orthogonal frequency division multiplexed system. In some OFDM implementations the second period of time is a period of time used to transmit an orthogonal frequency division multiplexed symbol. The second period of time, e.g., the beacon transmission period, may periodically repeat during said first period of time. The method in this example may also include transmitting during a third period of time a third signal including a set of Y tones, where Y<N, each tone in said third set of Y tones having 20% or less of said maximum average total base station transmission power used by said base station transmitter during any 1 second period during said first period of time, said third period of time having the same duration as said second period of time. The third period of time may be, and in some embodiments is, a symbol time in which data signals, pilot signals and/or control signals are transmitted. The third period of time may be different from the second period of time or overlap the second period of time. When the third period of time overlaps or is the same as the second period of time, a small portion of the total power transmitted during the period of time is available for use by the data, pilot and/or control signals which are modulated on the Y tones, e.g., 20% or less due to the consumption of at least 80% power by the beacon signal(s), e.g., high power tone or tones. The high power tones, e.g., one or more beacon tones, may be and in various embodiments are, transmitted at a predetermined fixed frequency. The predetermined frequency may, and often does, have a fixed frequency offset>0 from the lowest frequency tone in said set of N tones. This allows the beacon signal to provide an indication of the boundary of the set of N tones.

In various embodiments at least one of said X tones, e.g., beacon tones, is transmitted at a frequency which is determined as a function of at least one of a base station identifier and a sector identifier. In many implementations, for each repetition of said second period of time in said first period of time there are at least Z repetitions of said third period of time in said first period of time where Z is at least 10, e.g., there are many more data transmission symbol time periods than beacon signal symbol time periods. In some cases Z is at least 400, e.g., there are at least 400 data transmission symbol times for each beacon transmission signal time. In some implementations during a fourth period of time a fourth signal including G tones is transmitted, where G is less than 5, and where at least 80% of said maximum average total base station transmitter power used by said base station transmitter during any 1 second period during said first period of time is allocated to said G tones. The G tones may correspond, e.g., to a symbol transmission time in which a different beacon signal from the one transmitted in the second period of time is transmitted. In one embodiment the frequency of at least one of said G tones is a function of at least one of a base station identifier and a sector identifier, and said at least one of said G tones is not one of said set of X tones. In various implementations the second and fourth periods of time periodically repeat during said first period of time. In some embodiments, a base station includes a transmitter control routine which includes modules, e.g., software modules or blocks of code, which control the generation and transmission of the signals during each of the first, second, third and fourth transmission periods. A separate control module may not be used for the first signal period when it is fully comprised of second, third and fourth signal transmission periods with the control modules for these periods control transmission. Accordingly, transmission control means may include one or more software modules with each software module controlling a different transmission feature, e.g., a separate transmission feature of the invention recited in one of the pending claims. Thus, while a single transmitter control routine may be present in a base station, the single routine may, and often does, include multiple different control modules.

A communication method for use in a base station of a sectorized cell which is directed to various synchronization features of the invention will now be described. In accordance with the method the base station transmits symbols, e.g., modulated symbols, into multiple sectors of said cell using orthogonal frequency division multiplexed symbols. The frequency division multiplexed symbols are generated by modulating information on one or more symbols and, in most cases, adding a cyclic prefix to the form the modulated symbol to be transmitted. The method comprises, in one embodiment, operating each sector to use a set of tones to transmit orthogonal frequency division multiplexed symbols, each orthogonal frequency division multiplexed symbol. The symbols are transmitted at symbol transmission start times. Thus, each transmitted symbol has a symbol transmission start time. In accordance with the invention each sector is controlled to use the same set of tones, the same duration of each symbol transmission period, and substantially the same symbol start times. In various embodiments each of said orthogonal frequency division multiplexed symbols include a cyclic prefix having a cyclic prefix length. In some of these embodiments substantially the same symbol transmission start times are such that the difference between the symbol transmission start times of any two adjacent sectors are at most the amount of time used to transmit a cyclic prefix. A set of hopping sequences is often used to allocate tones to a first set of communication channels in a first sector of said cell. The same set of hopping sequences is used to allocate tones to a corresponding set of communication channels in each of the other sectors of the cell. Each hopping sequence has a start time. The start time of each hopping sequence in said set of hopping sequences is the same in each of said sectors in one embodiment. In order to allow devices to distinguish between signals corresponding to different sectors of a cell with different information to be transmitted, e.g., modulated symbols, may be subject to a scrambling operation prior to transmission. Different scrambling sequences are used in different sectors. Thus, the scrambling sequence provides a way of distinguishing between data corresponding to different sectors. Thus, in at least one embodiment, scrambling of modulation symbols is performed prior to transmitting said modulation symbols using said transmitted symbols with a different scrambling sequence being used in each sector of the cell. The communication channels in each of the sectors of a cell are normally partitioned into segments, segments of corresponding channels in each of the sectors of the cell have the same segment partitions and have segment start times which are substantially the same, such that for a segment of a channel in one sector there is another segment of the corresponding channel where the two segments use the same set of hopping sequences and the same segment start times. In some embodiments the segment start times for segments of the same channel in different cells differ by no more than the time used to transmit a cyclic prefix. Pilot tones are often transmitted in each sector of the cell. In various embodiments the method of the invention includes transmitting a portion of pilot tones in each sector of the cell according to a pilot tone hopping sequence, the same pilot tone hopping sequence being used in each sector but with a different fixed tone offset being used in each of the sectors of a cell. The pilot tone hopping sequence may be a slope hopping sequence. In such implementations, adjacent cells can use different slope values for determining the slope hopping sequences to be used. In some implementations, pilot tones in each sector of the cell are transmitted according to a set of pilot tone hopping sequences, the same set of pilot tone hopping sequences being used in each sector but with different fixed tone offsets being used in each of the sectors of the cell. In such a case, pilot tone hopping sequences in a set of pilot tone hopping sequences corresponding to a sector are often offset from each other by a corresponding preselected set of offsets, the corresponding preselected set of offsets being the same in each sector of the cell. Furthermore in such a case the set of pilot tone hopping sequences used in any two adjacent sectors of the cell may not be identical due to the use of different fixed tone offsets in the adjacent sectors. The set of pilot tone hopping sequences being used in any two adjacent sectors of the cell need not be, and sometimes are not identical, due to the use of different fixed tone offsets in the adjacent sectors for the pilot tone hopping sequences.

The power control methods of the present invention can be used alone or in combination with the other features and/or methods of the invention. In accordance with an exemplary power control method of the invention, a set of tones is used in a cell. A transmitter in the cell transmits into a first sector of said cell over a plurality of symbol times using tones from said set of tones. The cell includes a second sector adjoining said first sector. The transmitter transmits into said second sector on first and second communications channels, the first communications channel including a first subset of said set of tones during each of a first subset of said plurality of symbol times, the second communications channel including a second subset of said set of tones during each of said first subset of said plurality of times, said first subset of said set of tones and said second subset of said set of tones being different from each other during each symbol time. In one such implementation, the exemplary method includes operating the transmitter to transmit on said first and second channels into said first sector in a synchronous manner with transmissions made by said transmitter into said second sector; and controlling a total transmission power of the tones corresponding to the first channel in the first sector during said first subset of said plurality of symbol times to be greater than 20% and less than 500% of a total power of the tones corresponding to the first channel transmitted into the second sector, during said first subset of said plurality of symbol times. In some implementations controlling the total transmission power of the tones corresponding to the first channel includes limiting the total power used in said first subset of symbol times to be no more than a fixed fraction of a maximum average total transmission power used by said transmitter in the first sector during any 1 hour period, said fixed fraction also being used to limit the total transmission power of the tones corresponding to the first channel in the second sector during the first subset of symbol times to be no more than said fixed fraction of a maximum average total transmission power used by said transmitter in the second sector during any 1 hour period, said fixed fraction being less than 100%. The symbol times are, in some implementations, orthogonal frequency division multiplexed symbol transmission time periods. In such cases the tones are normally orthogonal frequency division tones. The set of tones may be, and often is, different during at least two symbol times. Symbols transmitted at different times may correspond to different symbol constellations. In some implementations, said transmitter transmits into said first sector symbols corresponding to a first constellation on said first channel during said first subset of symbol times and transmits symbols corresponding to a second constellation during a second subset of said plurality of symbol times, the second constellation including more symbols than the first constellation, in such a case, the method includes controlling a total transmission power of the tones corresponding to the first channel in the first sector during the second subset of said plurality of symbol times to be greater than 50% and less than 200% of a total power of the tones transmitted in the second sector corresponding to the first channel during said second subset of said plurality of symbol times. In another embodiment the transmitter transmits into the first sector symbols at a first channel coding rate on said first channel during said first subset of said plurality of symbol times and transmits symbols at a second channel coding rate during a second subset of said plurality of symbol times, said second channel coding rate being higher than said first channel coding rate. In such an implementation, the method further comprises controlling a total transmission power of the tones corresponding to the first channel in the first sector during the second subset of said plurality of symbol times to be greater than 50% and less than 200% of a total power of the tones transmitted in the second sector corresponding to the first channel during said second subset of said plurality of symbol times. The total transmission power of the transmitted tones corresponding to the first channel in the first sector during the first subset of said plurality of symbol times may be, and in some implementations is, equal to the total transmission power of the transmitted tones in the first channel in the second sector during said first subset of said plurality of symbol times. In many cases, the first subset of said plurality of symbol times will include many, e.g., at least 14, consecutive symbol times. The method further comprises controlling the total power of the tones transmitted in the first sector corresponding to the first channel during a fourth subset of said plurality of symbol times to be one of greater than 200% and less than 50% of the total power of the tones transmitted in said first sector corresponding to the second channel during said fourth subset of said plurality of symbol times. In some implementations the power control method includes controlling the total power of the tones transmitted in the first sector corresponding to the first channel during a fourth subset of said plurality of symbol times to be one of greater than 200% and less than 50% of the total power of the tones transmitted in said first sector corresponding to the second channel during said fourth subset of said plurality of symbol times. The fourth subset of said plurality of symbol times sometimes includes at least 14 consecutive symbol times and in some cases more than 40. In some implementations the first and second sectors use a third communications channel during a second subset of said plurality of symbol times, the third communications channel includes a third subset of said set of tones during each of said second subset of said plurality of symbol times. In such a case the power control method often further includes the step of controlling the transmitter during said second subset of said plurality of symbol times, to limit the total transmission power on tones corresponding to said third communications channel transmitted by said transmitter to be less than 10% of the total transmission power used by said transmitter to transmit tones into said second sector corresponding to the third channel during said second subset of said plurality of symbol times. In some cases, to limit interference e.g., between sectors for segments used to transmit control signals, the method includes controlling the transmitter during said second subset of said plurality of symbol times, to limit total transmission power on tones corresponding to said third communications channel transmitted by said transmitter to be zero. In various implementations, the method of the invention is further directed to controlling the allocation of resources, e.g., segments, corresponding to the third communications channel to wireless terminals. In such an implementation the method includes operating the base station or an apparatus included therein to identify wireless terminals in a boundary area which corresponds to a boundary between said first and second sectors; and to allocate the resources, e.g., channel segments, corresponding to the said third channel to at least one of said identified wireless terminals. Identifying wireless terminals in the boundary region may include receiving from a wireless terminal first information indicating an amount of intersector interference measured by said wireless terminal and second information indicating an amount of background interference measured by said wireless terminal. Identifying wireless terminals in boundary regions may alternatively or in addition, include receiving a signal, e.g., a location signal, from a wireless terminal in said boundary area a signal indicating that said wireless terminal is in said boundary area. In some power control embodiments, the first and second sectors use said third communications channel during a third subset of said plurality of symbol times, said third subset of said plurality of symbol times being different from said second subset of said plurality of symbol times. In such a case, the method may further comprise controlling said transmitter during said third subset of said plurality of symbol times, to use a total transmission power on tones corresponding to said third communications channel transmitted by said transmitter into the first sector to be at least 1000% used by said second sector to transmit tones corresponding to the third channel into the second sector during said third subset of said plurality of symbol times. This 1000% represents power 10 times that used in the second sector. This power difference will often be sufficient to make intersector interference seen in the first sector to be a relatively small component of signal interference. In some implementations said first and second sector use said third communications channel during a third subset of said plurality of symbol times, said third subset of said plurality of symbol times being different from said second subset of said plurality of symbol times. In one such implementation the method further includes: controlling said transmitter during said third subset of said plurality of symbol times, to use a total transmission power on tones corresponding to said third communications channel transmitted by said transmitter into the first sector to be at least 1000% used by said second sector to transmit tones corresponding to the third channel into the second sector during said third subset of said plurality of symbol times. In the power control implementations just discussed, a base station control routine may include different segments of code to perform each of the recited control operations. Furthermore, while antennas or other elements of the base station transmitter may be different in each sector, in many implementations the common control logic and control functionality associated with the base station is responsible for controlling transmission in various sectors in accordance with one or more features of the invention.

Additional features, benefits and embodiments of the present invention are discussed in the detailed description which follows.

BRIEF DESCRIPTION OF THE FIGURES

FIG. 9 further illustrates the concept of corresponding control or data channel segments within the sectors of a cell in accordance with the present invention.

DETAILED DESCRIPTION OF THE INVENTION

With the OFDM spread spectrum system, the tones used in a given cell are all orthogonal. Therefore, the data hopping sequences and the physical channels do not interfere with each other. Given the wireless channel propagation characteristics, depending on its location, a wireless terminal may experience a large dynamic range of channel conditions measured in terms of signal-to-interference ratio (SIR) or signal-to-noise ratio (SNR). Such a property can be exploited to enhance the system capacity. For example, in accordance with the invention, a scheduler may optimally balance the power allocation in the traffic channel by serving simultaneously wireless terminals with dramatically different wireless channel conditions. In that case, a wireless terminal with a bad wireless channel condition may be allocated with a large portion of transmission power and possibly a small portion of bandwidth thereby gaining service robustness, while another wireless terminal with a good wireless channel condition may be allocated with a small portion of transmission power and possibly a large portion of bandwidth and can still achieve a high burst data rate.

The OFDM spread spectrum system of the invention can be combined with the sectorized antenna to improve the overall system performance. However, in reality, antenna isolation is never perfect. A signal transmitted in one sector may leak to another sector with an attenuation factor, thereby causing interference between sectors, i.e., inter-sector interference. The inter-sector interference may reduce the gains of power and burst data rate allocation. For example, in the absence of the inter-sector interference, a wireless terminal with a good wireless channel condition may be allocated with a small portion of transmission power and can still achieve high burst data rate. In the presence of the inter-sector interference, the wireless terminal may not achieve the same high burst data rate with the same amount of transmission power. The situation becomes especially severe when the inter-sector interference comes from a traffic channel that is transmitted at much higher power, for example to serve another wireless terminal with bad channel condition.

Figure 1:
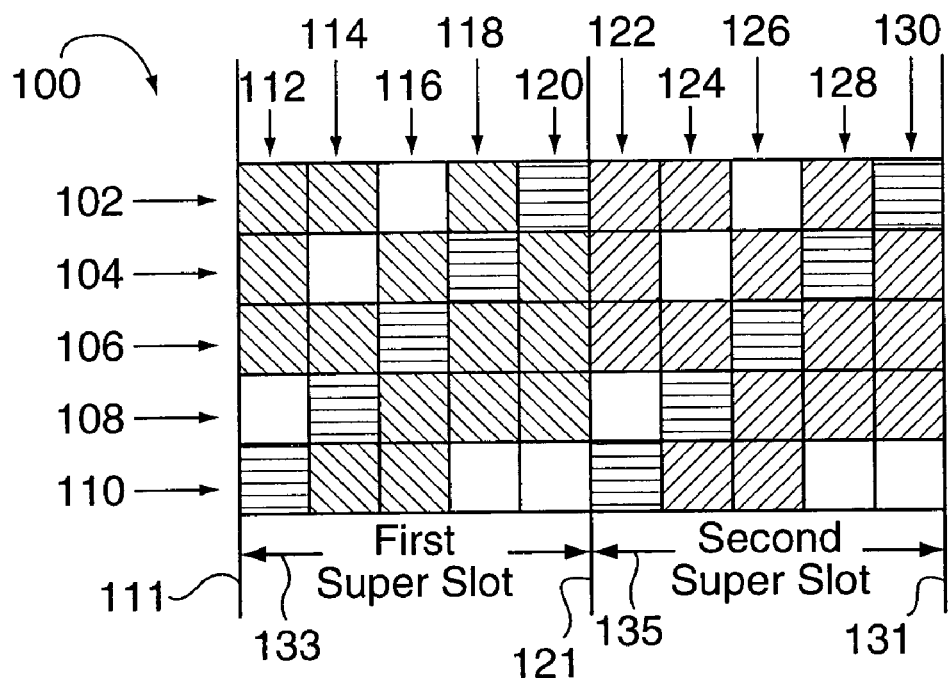
FIG. 1 illustrates the general concepts of data and pilot tone hopping sequences, control and data traffic channels, channel segments, and super slots.
Figure 2:
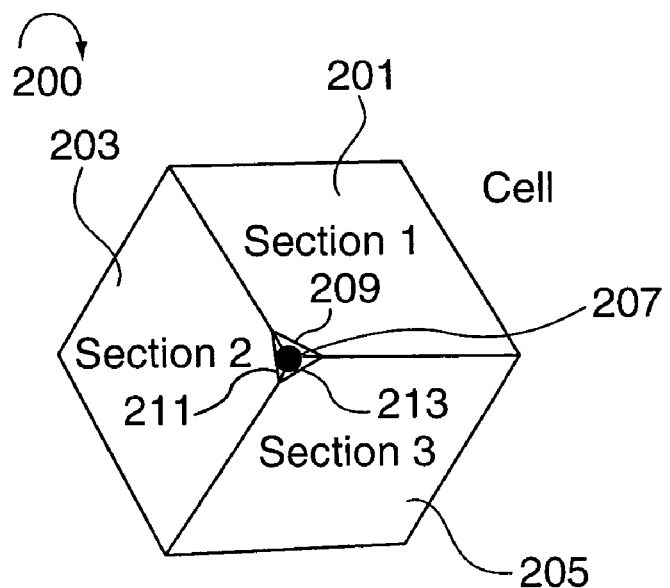
FIG. 2 shows a three sector cell with a base station employing a 3 sector antenna.
Figure 3:
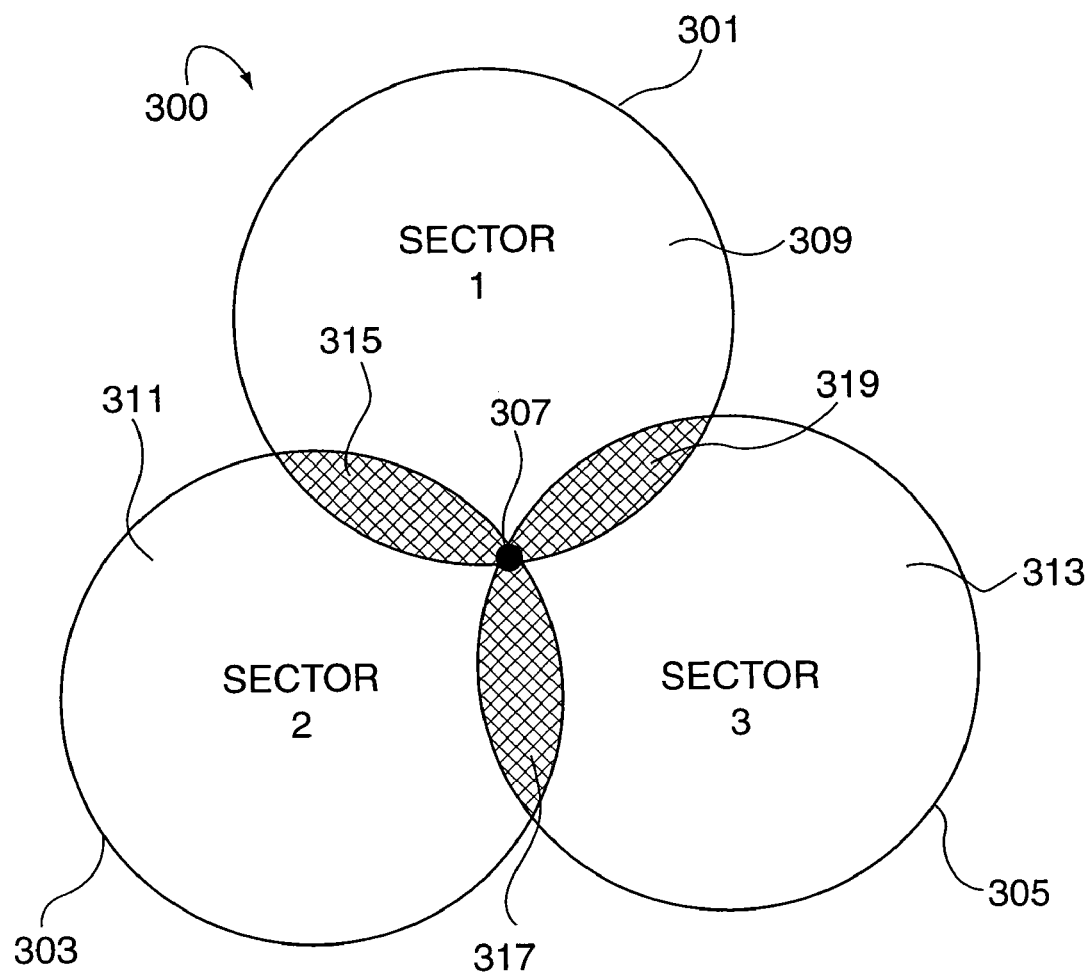
FIG. 3 shows a three sector cell with a base station illustrating the concept of inter-sector boundary interference regions.

FIG. 3 illustrates an exemplary cell 300 including 3 sectors: sector 1 301, sector 2 303, and sector 3 305 and a base station 307 including a 3 sector antenna. The base station 307 may communicate with end nodes, e.g. mobile nodes or mobile terminals, situated at arbitrary locations within the cell 300 via wireless links. From an interference perspective, cells may be deemed to be comprised of sector boundary areas where interference from a neighboring sector may be a severe problem and non-sector boundary areas. In the FIG. 3 illustration of the cell 300, the non-sector boundary areas are distinguished from the boundary areas. The cell 300 includes non-sector boundary area 1 309, non-sector boundary area 2 311, and non-sector boundary area 3 313. The cell 300 also includes sector boundary areas: sector 1-2 boundary area 315, sector 2-3 boundary area 317, and sector 3-1 boundary area 319. The level of sectorization isolation can be described in terms of the amount of leakage between the non-sector boundary areas 309, 311, and 313. For example if a mobile node is situated in non-sector boundary area 1 309 leakage may occur from signal intended for sector 2 303 and signal intended for sector 3 305. The leakage in the non-sector boundary areas 309, 311, 313, is typically −13 dB to −15 dB, and will depend on factors such as the base station 307 antenna type. In the sector boundary regions (sometimes referred to as 0 dB regions), areas 315, 317, and 319 the signal strength at the reception point, may be almost equivalent from the two adjacent sector antennas. The present invention describes method and apparatus to improve the capacity of the system when deployed in a sectorized configuration.

For the purpose of illustration and description, a 3-sector cell 300 is used in FIG. 3 and in the subsequent examples of FIGS. 7, 8, 9, 10, 11, 12, and 13. However, it is to be understood that the present invention is applicable to other sectorization scenarios. In a sectorized cell, the sectors are indexed. For example, in the 3-sector cell 300 of FIG. 3, the sector indices can be 1, 2, and 3.

Figure 4:
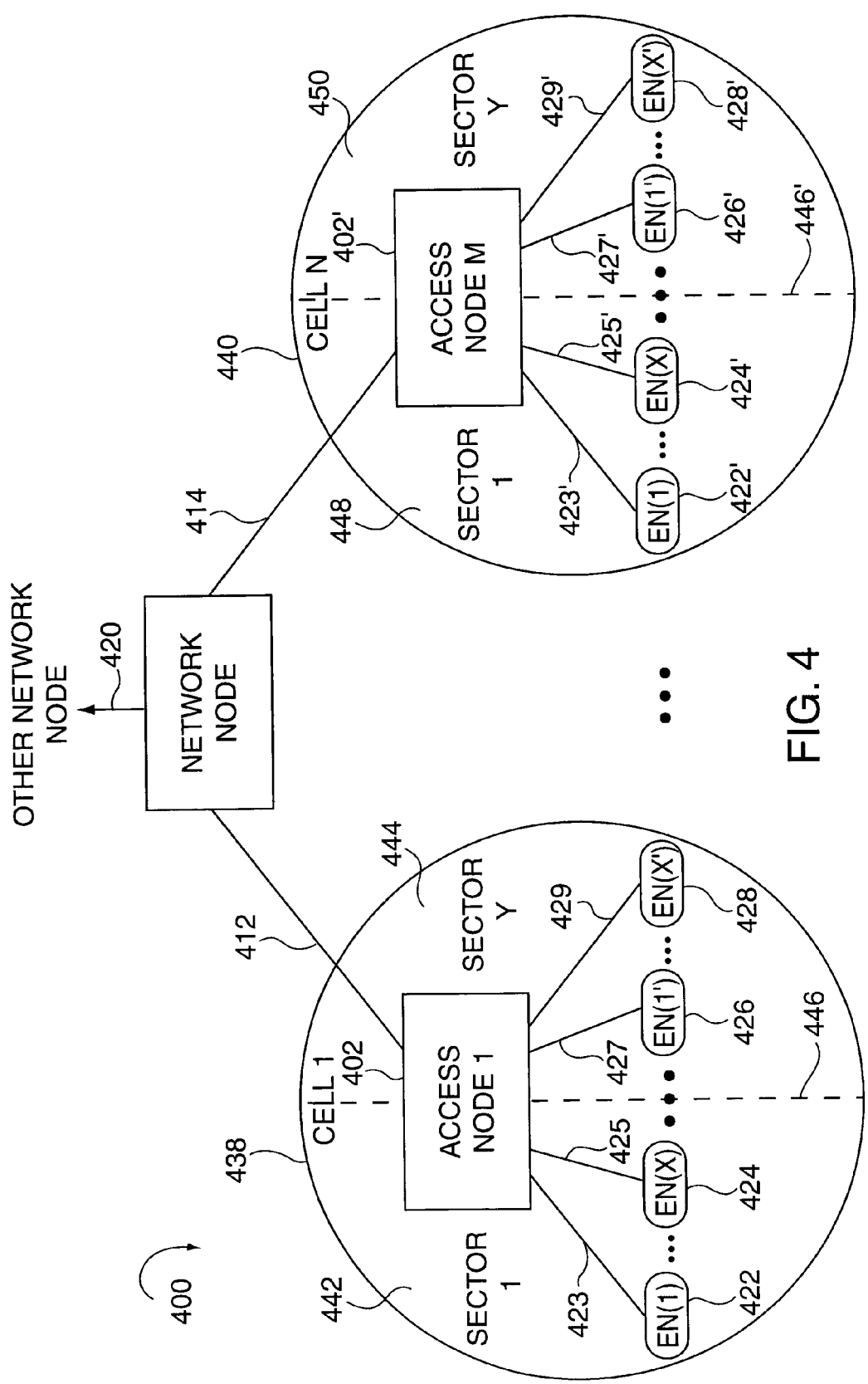
FIG. 4 illustrates an exemplary communications system utilizing cell sectorization in accordance with the present invention.

FIG. 4 illustrates an exemplary communications system 400 employing cell sectorization and wireless communication in accordance with the present invention. The communications system 400 includes a plurality of cells, cell 1 438, cell N 440. Cell 1 438 represents the coverage area for access node (AN) 1 402 located within cell 1 438. The access node 1 402 may be, for example, a base station. Cell 1 438 is subdivided into a plurality of sectors, sector 1 442, sector Y 444. A dashed line 446 represents the boundaries between sectors 442, 444. Each sector 442, 444 represents the intended coverage area corresponding to one sector of the sectorized antenna located at the access node 1 402. Sector 1 442 includes a plurality of end nodes (ENs), EN(1) 422, EN(X) 424 coupled to AN 1 402 via wireless links 423, 425, respectivley. Similarly, sector Y 444 includes a plurality of end nodes, EN(1') 426, EN(X') 428 coupled to AN 1 402 via wireless links 427, 429, respectively. The ENs 422, 424, 426, 428 may be, e.g., mobile nodes or mobile terminals and may move throughout the system 400.

Cell N 440 is subdivided into a plurality of sectors, sector 1 448, sector Y 450 with sector boundaries 446'. Cell N 440 is similar to cell 1 438 and includes an access node M 402', and a plurality of ENs 422', 424', 426', 428' coupled to AN M 402' via wireless links 423', 425', 427', 429', respectively.

The access nodes 402, 402' are coupled to a network node 406 via network links 412, 414, respectively. The network node 406 is coupled to other networks nodes, e.g. other access nodes, intermediate node, Home Agent Nodes or Authentication, Authorization Accounting (AAA) server nodes, via network link 420. The network links 412, 414, 420, may be, for example, fiber optic cables.

Figure 5:
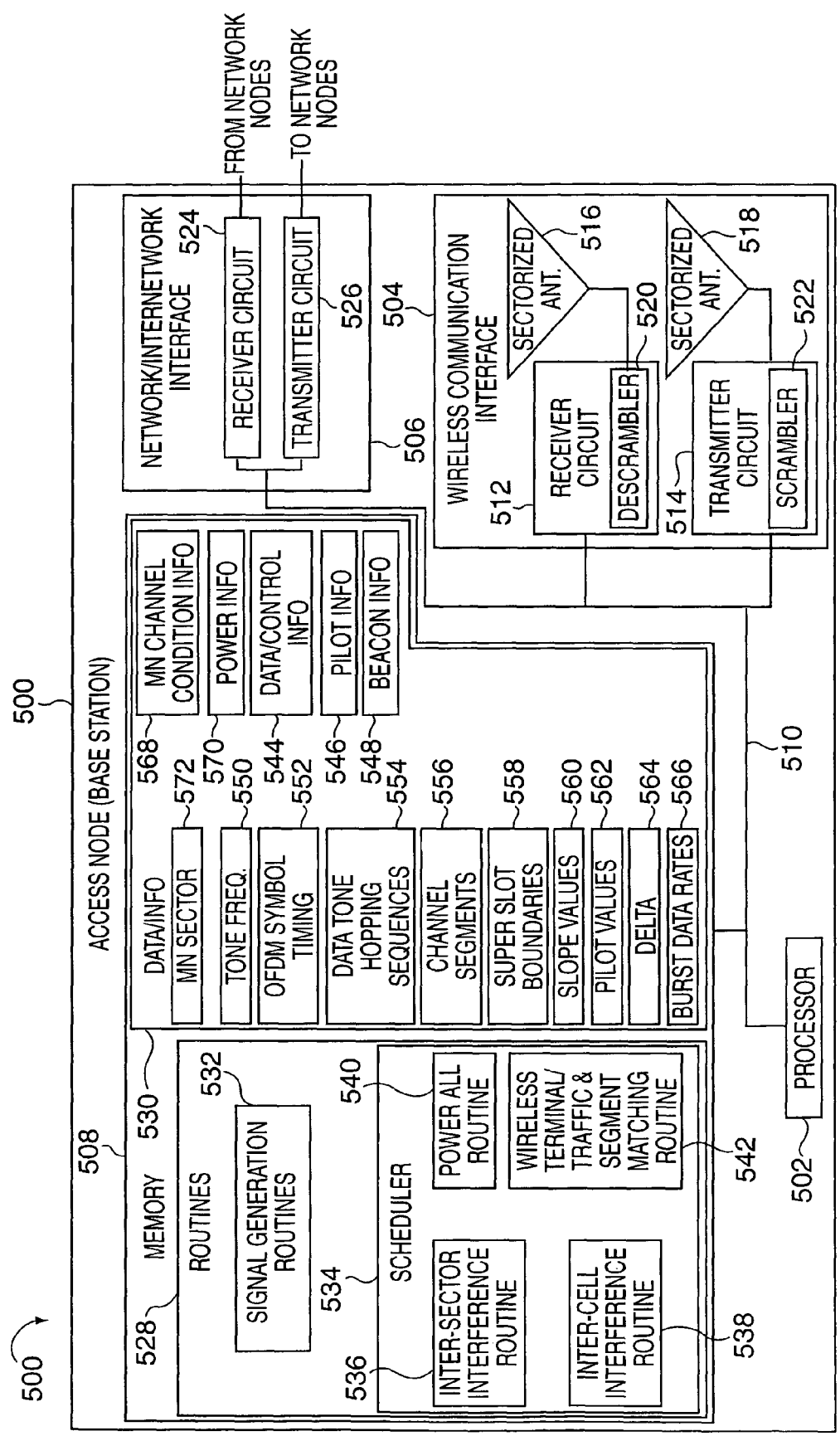
FIG. 5 illustrates an exemplary access node that may be used in the communication system of FIG. 4 in accordance with the present invention.

FIG. 5 illustrates an exemplary access node 500 of the present invention that may be used in the communications system 400 of FIG. 4, e.g., AN1 402 of FIG. 4. The access node 400 includes a processor 502, e.g., CPU, a wireless communications interface 504, a network/Internetwork interface 506, and a memory 508. The processor 502, wireless communications interface 504, network/Internetwork interface 506, and memory 508 are coupled together by a bus 510 over which the elements 502, 504, 506, 508, can exchange data and information.

The processor 502 controls the operation of the access node 500 by executing routines and utilizing data within the memory 528 in order to operate the interfaces 504, 506, perform the necessary processing to control basic functionality of the access node 500 and to implement the features and improvements employed in the sectorized system in accordance with the present invention.

The wireless communications interface 504 includes a receiver circuit 512 and a transmitter circuit 514 coupled to sectorized antennas 516, 518, respectively. The receiver circuit 512 includes a Descrambler circuit 520 and the transmitter circuit 514 includes a scrambler circuit 522. The sectorized antenna 516 receives signals from one or more mobile nodes, e.g. EN1 422 of FIG. 4. The receiver circuit 512 processes the received signals. The receiver circuit 512 uses its descrambler 520 to remove the scrambling sequence if scrambling was used during transmission by the mobile node. The transmitter circuitry 514 includes a scrambler 522 which may be used to randomize the transmitted signal in accordance with the present invention. The access node 500 may transmit signal to the mobile nodes, e.g. EN1 422 of FIG. 4, over its sectorized antenna 518.

The network/internetwork interface 506 includes a receiver circuit 524 and a transmitter circuit 526 which will allow the access node 500 to be coupled to other network nodes, e.g. other access nodes, AAA servers, Home Agent Nodes, etc. and interchange data and information with those nodes via network links.

The memory includes routines 528 and data/information 530. The routines include signal generation routines 532 and a scheduler 534. The scheduler 534 includes various routines such as an inter-sector interference routine 536, an inter-cell interference routine 538, a power allocation routine 540, and a wireless terminal/traffic segment matching routine 542. The data/information 530 includes data/control information 544, pilot information 546, beacon information 548, tone frequency information 550, OFDM signal timing information 552, data tone hopping sequences 554, channel segments 556, super slot boundary information 558, slope values 560, pilot values 562, delta 564, burst data rates 566, MN channel condition information 568, power information 570, and MN sector information 572. The tone frequency information 550 includes sets of tones used for different signals: set of N tones used for OFDM signals, sets of X tones used for some beacon signals, sets of Y tones used for OFDM signals, and sets of G tones used for other beacon signals, and repetition rate information associated with the various sets of tones. Power information 570 includes wide and narrow inter-sector transmission power control range information, inter-channel transmission power allocation range information, boundary transmission power range information, and power levels allocated for the channels in each sector.

The signal generation routines 532 utilize the data/info 530, e.g., super slot boundary information 558, tone frequency information 550, and/or OFDM symbol timing information 552, to perform signal synchronization and generation operations. Signal generation routine 532 also utilizes the data/info, e.g., the data tone hopping sequences 554, data/control info 544, pilot info 546, pilot values 562, and/or sector information 572 to implement data/control hopping and pilot hopping sequences. In addition signal generation routine 532 may utilize data/info 530, e.g., beacon info 530, to generate beacon signals in accordance with the present invention.

The inter-sector interference routine performs operations using the methods of the present invention and the data/info 530, such as, pilot info 546, MN channel condition information 568, and MN sector information 572 to evaluate and reduce inter-sector interference within a given cell. The inter-cell interference routine 536 utilizes the methods of the present invention and data/info 530, e.g., reported MN channel condition information 568, and slope values 560, to evaluate and reduce the effects of inter-cell interference. The power allocation routine 540 uses the methods of the present invention and data info, e.g. power info 570 and delta 564, to control the power allocation to the various traffic channels, e.g., to optimize performance. The wireless terminal/traffic and segment matching routine 542 uses the data/info 530, e.g. MN channel condition information 568, power information 570, channel segments 556, and burst data rates 566 to assign wireless terminals as a function of their power needs to be in an appropriate channel segment in accordance with the invention.

Various specific functions and operations of the access node 500 will be discussed in more detail below.

Figure 6:
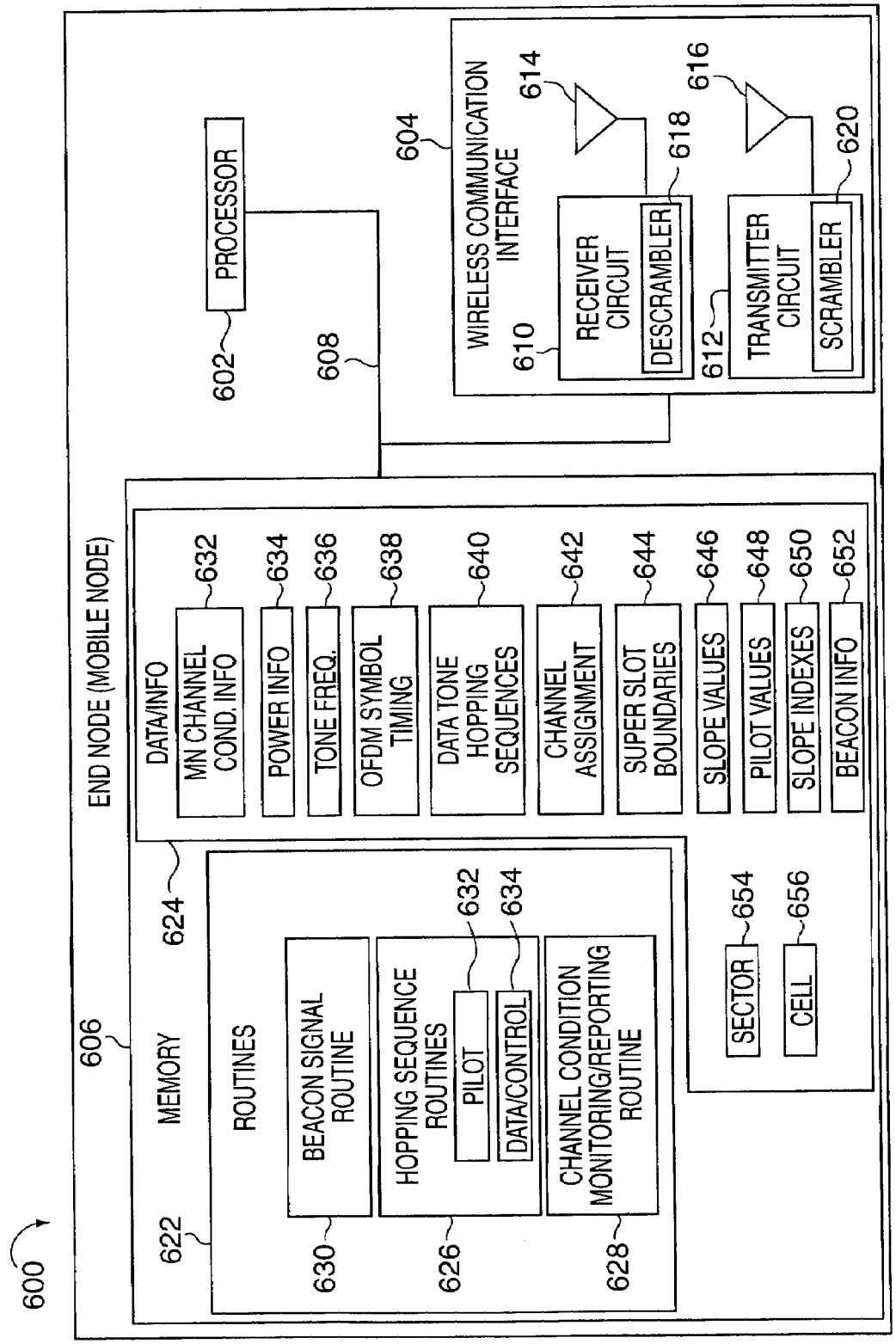
FIG. 6 illustrates an exemplary end node that may be used in the communications system of FIG. 4 in accordance with the present invention.

FIG. 6 illustrates an exemplary end node (EN) 600, e.g. a wireless terminal such as mobile node (MN), mobile, mobile terminal, mobile device, fixed wireless device, etc., that may be used in the exemplary communications system 400 of FIG. 4 in accordance with the present invention. In this application, at various locations, references may be made to the end node using various terminology and various exemplary embodiments of the end node such as, e.g., wireless terminal, mobile node, mobile, mobile terminal, fixed wireless device, etc.; it is to be understood that the apparatus and methods of the invention are also application to the other embodiments, variations and descriptions of the end node. The end node 600 includes a processor 602, e.g., CPU, a wireless communications interface 604, and a memory 606. The processor 602, wireless communications interface 604, and memory 606 are coupled together by a bus 608 over which the elements 602, 604, and 606, can interchange data and information.

The processor 602 controls the operation of the end node 600 by executing routines and utilizing data within the memory 606 in order to operate the wireless communications interface 604, perform the necessary processing to control basic functionality of the end node 600 while implementing the features and improvements employed in the sectorized system in accordance with the present invention.

The wireless communications interface 604 includes a receiver circuit 610 and a transmitter circuit 612 coupled to antennas 614, 616, respectively. The receiver circuit 610 includes a Descrambler circuit 618 and the transmitter circuit 612 includes a scrambler circuit 620. The antenna 614 receives broadcast signals, e.g., from an access node, e.g. AN1 402 of FIG. 4. The receiver circuit 610 processes the received signal and may use its descrambler 618, e.g., decoder, to remove scrambling if scrambling was used during transmission by the access node. The transmitter circuitry 612 includes a scrambler 620, e.g., encoder, which may be used to randomize the transmitted signal in accordance with the present invention. The end node 600 may transmit the encoded signal to the access node over its antenna 616.

The memory 606 includes routines 622 and data/information 624. The routines 622 include hopping sequence routines 626, a channel condition monitoring/reporting routine 628, and a beacon signal routine 630. The data/information 624 includes MN channel condition information 632, power information 634, tone frequency information 636, OFDM signal timing information 638, data tone hopping sequences 640, channel assignment information 642, super slot boundary information 644, slope values 646, pilot values 648, slope indexes 650, beacon info 652, sector identification 654, and cell identification 656.

The hopping routines 626 include a data/control hopping sequence routine 634 and a pilot hopping sequence routine 632 which performs operations using the methods of the present invention and the data/info 624, such tone frequency info 636, OFDM signal timing information 638, data tone hopping sequences 640, channel assignment information 642, super slot boundary information 644, slope values 646, and/or pilot values 648 to process the received data, identify the cell 656 and sector 654 that the mobile 600 is operating in and the corresponding access node 500 of FIG. 5 that is communicating with the end node 600. The channel condition monitoring/reporting routine 628 performs operations using the methods of the present invention and data info 624, e.g., MN channel condition info 632, power info 634, and channel assignment 642 to evaluate the status and quality of the wireless link to the access node 500 and subsequently report that data back to the access node 500 for use in scheduling. The beacon signal routine 630 performs operations relating to beacon signals in accordance with the methods of the present invention. Beacon signal routine 630 uses the data/info 624, e.g. beacon info 652, power info 634, tone frequency info 636, super slot boundaries 644, and/or slope indexes 650 to perform functions such as, e.g., synchronization of super slot boundaries, determine boundaries of frequency band and sector index 654, determine slope value 646, determine cell location 656 and pilot values 648.

Various specific functions and operations of the end node 600 will be discussed in more detail below.

Physical layer full synchronization across the sectors will now be described.

Figure 7:
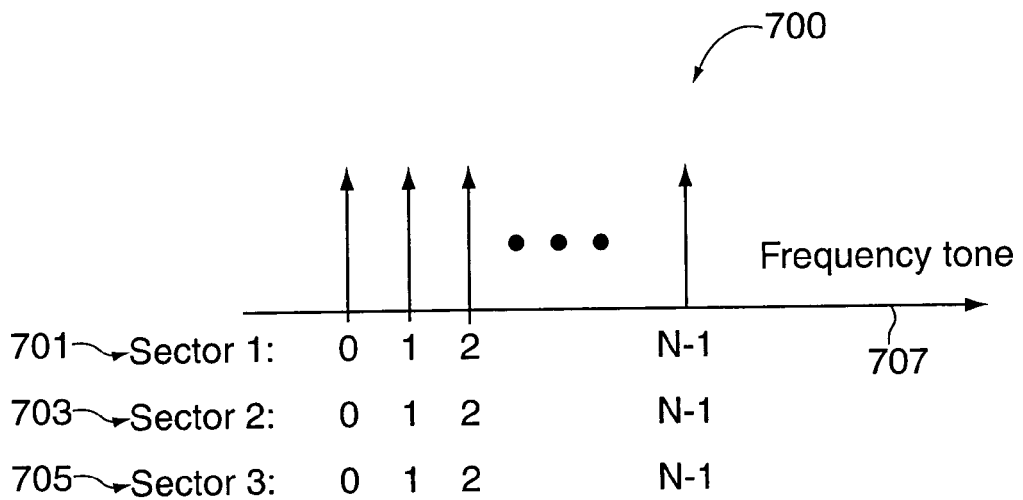
FIG. 7 illustrates frequency tone synchronization throughout the sectors of a cell in accordance with the present invention.

In accordance with the invention, the same spectrum is reused in each of the sectors in a cell of the sectorized OFDM spread spectrum system. Moreover, in accordance with one particular exemplary embodiment of the invention, each of the sectors of a cell are fully synchronized in terms of tone frequencies, OFDM symbol timing, data tone hopping sequences, channel segments and super slot boundaries. While such synchronization is desirable, aspects of the invention may be used in systems where synchronization between sectors in a cell is not so complete as in the case of the particular exemplary embodiment. Specifically, in each of the sectors of a cell the same set of tones is used with identical sets of tone frequencies being included in each set. The OFDM symbol timings are also identical. FIG. 7 700 illustrates the sets of the tone frequencies used in each of 3 sectors which form a cell. The horizontal axis 707 of FIG. 7 corresponds to frequency. Each vertical arrow represents a frequency tone.

Rows 701, 703, 705 each correspond to a different sector of the exemplary cell. The same set of N tones is used in each sector, with the tones used in each sector being indexed 0 through N−1.

Figure 8:
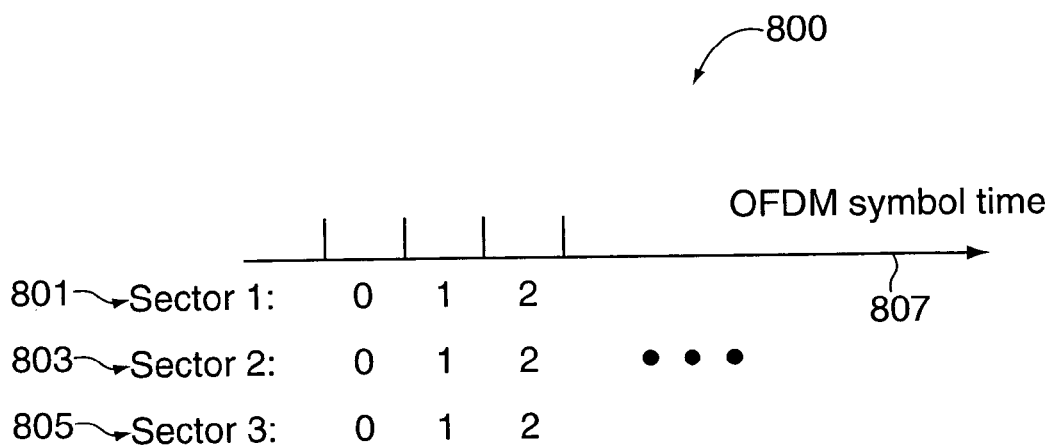
FIG. 8 illustrates OFDM symbol time synchronization throughout the sectors of a cell in accordance with the present invention.

FIG. 8 800 illustrates OFDM symbol timing used in the 3 sectors. The horizontal axis 807 of FIG. 8 represents how time can be divided in each sector according to symbol times, e.g., the time used to transmit an OFDM symbol. Each division on the horizontal axis 807 marks the start of a new symbol time in each of the sectors of a cell. Row 1 (801) corresponds to symbol times in sector 1 while rows 2 and 3 (803,805) correspond to symbol times in sectors 2 and 3 of the same cell. Note that symbol start times are synchronized in the three sectors of the cell. Each of the sectors of the cell derive the data tone hopping sequences using the same OFDM symbol index and the same value of SLOPE in Equation (1). Therefore, in each of the sectors, the tone frequencies occupied by the j-th tone hopping sequence at any OFDM time are identical and the super slot boundaries are also identical.

Figure 9:
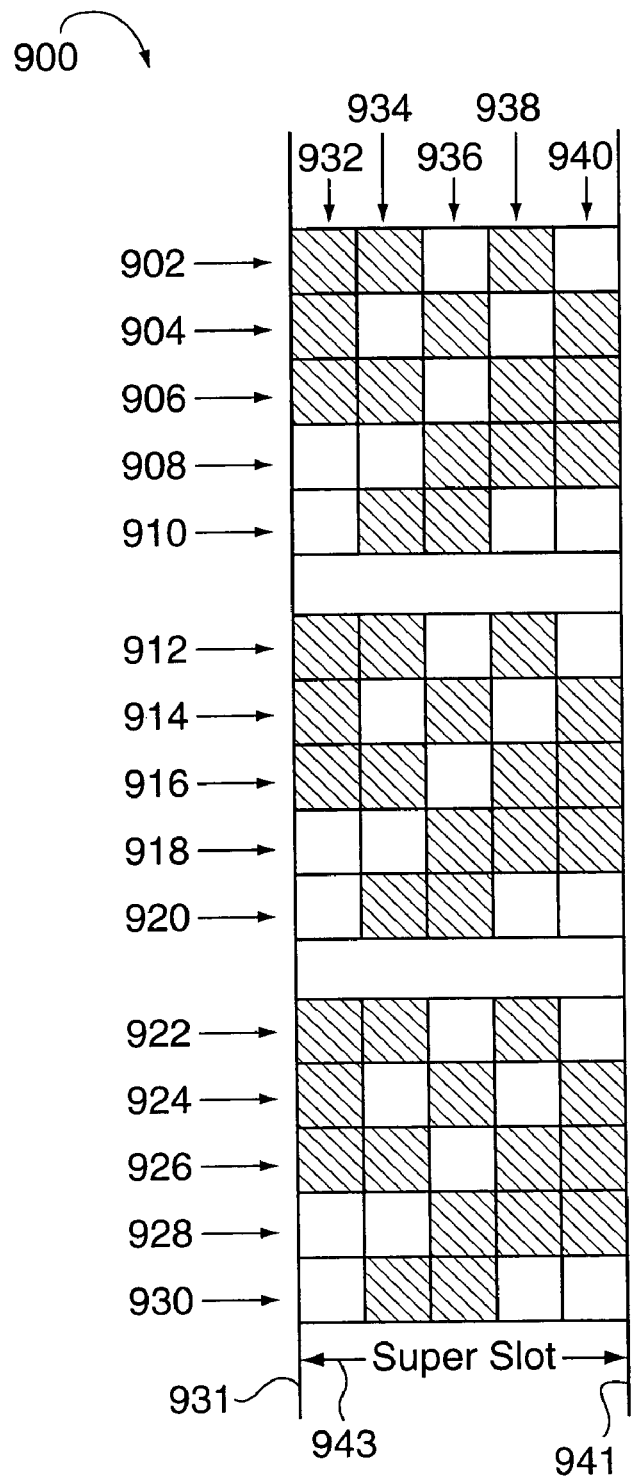
FIG. 9 illustrates that in all the sectors of a cell, the tone frequencies occupied by the j-th tone hopping sequence at any OFDM time are identical and that the super slot boundaries are identical in accordance with the present invention.

Furthermore, the physical layer channels and channel segments are constructed in the same way in each of the sectors in the exemplary cell. FIG. 9 shows a frequency vs time graph 900 to illustrate the control and data traffic channels and channel segments in the 3 sectors of the exemplary cell shown in FIG. 3.

FIG. 9 illustrates the transmission of symbols in each of the 3 sectors of the exemplary cell shown in FIG. 3 during a single superslot. In the FIG. 9 example, each horizontal division corresponds to a symbol transmission time where the exemplary superslot corresponds to 5 symbol times.

In the FIG. 9 example, a super slot 943, the time interval of one period of the data/control tone hopping sequence, is shown as the concatenation of five OFDM symbol times, represented by first through fifth columns 932, 934, 936, 938, 940 and defined by vertical time domain boundary lines 931 and 941.

FIG. 9 includes a first group of first through fifth rows 902, 904, 906, 908, and 910 which correspond to a first sector of the cell. Each row 902, 904, 906, 908, 910 corresponds to a different orthogonal frequency tone in the frequency domain of sector 1.

A second group of first through fifth rows 912, 914, 916, 918, and 920 corresponds to a second sector of the cell. Each row 912, 914, 916, 918, 920 corresponds to a different orthogonal frequency tone in the frequency domain of sector 2.

A third group of first through fifth rows 922, 924, 926, 928, and 930 corresponds to a third sector of the cell. Each row 922, 924, 926, 928, 930 corresponds to a different orthogonal frequency tone in the frequency domain of sector 3.

The same frequency tone is represented by first row 902 for sector 1, the first row 912 for sector 2, and the first row 922 for sector 3. Similarly, frequency tone equivalency exists across the three sectors for the following sets: (second row 904, second row 914, second row 924), (third row 906, third row 916, third row 926), (fourth row 908, fourth row 918, fourth row 928), (fifth row 910, fifth row 920, fifth row 930).

FIG. 9 also includes first through fifth columns 932, 934, 936, 938, and 940. Each column 932, 934, 936, 938, 940 corresponds to an OFDM symbol time in the time domain.

Shading is used in FIG. 9 to illustrate segments corresponding to an exemplary channel within the particular sector. For example, during the OFDM time interval represented by first column 932, a traffic channel for sector corresponds to and uses the 3 tone frequencies represented by first row 902, second row 904, and third row 906. In the FIG. 9 example, the three sectors allocate tones to channels using the same allocation scheme. Thus in sectors 2 and 3 the same tones are used for the channel as in sector 1.

As the OFDM symbol time changes through the superslot 943, data/control tone hopping occurs and the tone frequencies used by the data/control channels change. It can be seen that for the data/control traffic channel segment in a given sector, there is a corresponding data/control traffic channel segment in each of the other 2 sectors, since each sector in the exemplary embodiment has the same configuration of frequency tones and time intervals. The segments in the 3 sectors which correspond to the same channel are sometimes referred to as "corresponding channel segments."

Figure 10:
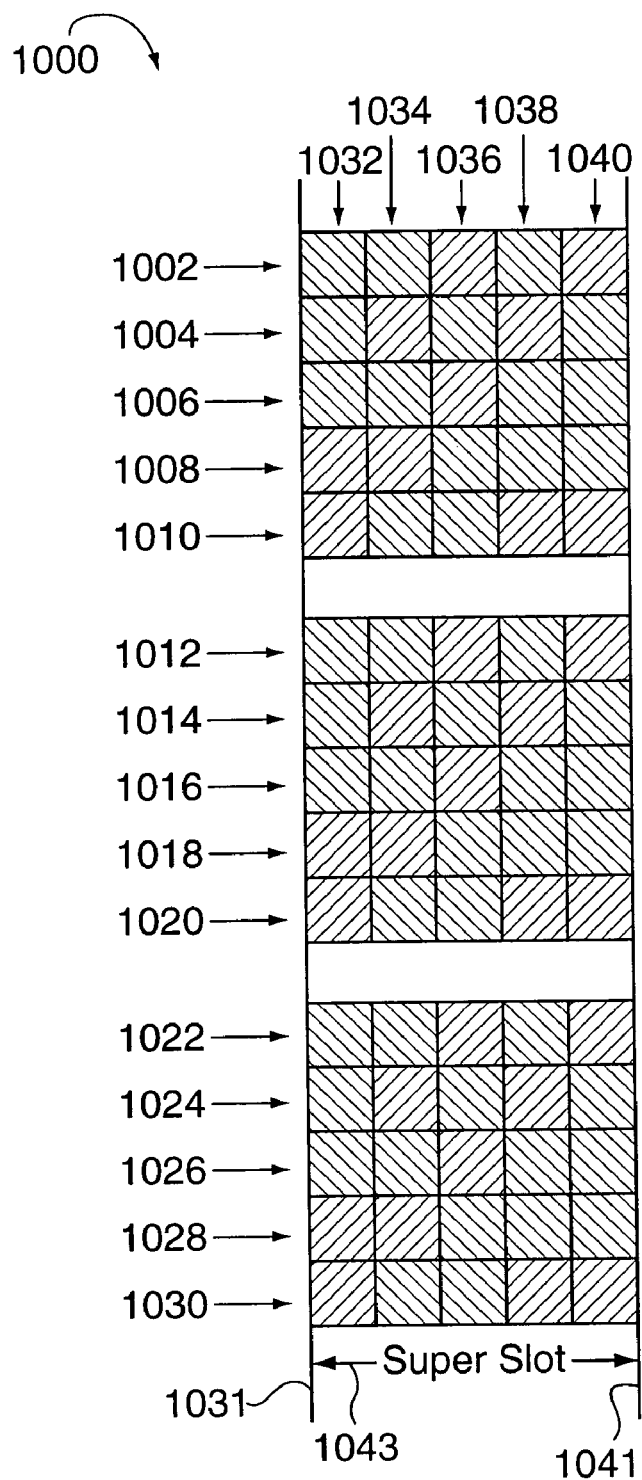
FIG. 10 shows an exemplary case where the frequency tones are distributed amongst two traffic channels. For each control or data traffic channel, the tone hopping sequence at any OFDM time is identical across the three exemplary sectors of the cell in accordance with the present invention.

FIG. 10 shows a frequency vs time graph 1000 to illustrate multiple corresponding data/control traffic channel segments in the 3 sectors.

First through fifteenth rows 1002, 1004, 1006, 1008, 1010, 1012, 1014, 1016, 1018, 1020, 1022, 1024, 1026, 1028, 1030 of FIG. 10 correspond to the same frequency tones as rows 902, 904, 906, 908, 910, 912, 914, 916, 918, 920, 922, 924, 926, 928, 930 of FIG. 9, respectively. First though fifth columns 1032, 1034, 1036, 1038, 1040 of FIG. 10 correspond to the same OFDM symbol times of first through fifth column 932, 934, 936, 938, and 940 of FIG. 9, respectively. A super slot 1043 defined by boundary lines 1031 and 1041 of FIG. 10, corresponds to the super slot 943 of FIG. 9.

The area with line shading descending from left to right is used to indicate a first set of corresponding data/control traffic segments, e.g., segments which correspond to the same channel. The area with line shading ascending from left to right represents a second corresponding data/control traffic segment in FIG. 10. For example, in the OFDM time interval represented by second column 1034, the first data/control traffic segment in sector 1 uses frequency tones represented by first row 1002, third row 1006, and sixth row 1010, while the second data/control traffic segment in sector 1 uses frequency tones represented by second row 1004 and fourth row 1008.

In the exemplary implementation, it can be seen that for any control or data traffic channel segment in a given sector, there is a corresponding control or data traffic channel segment in each of the other 2 sectors, which has the same configuration of frequency tones and time intervals. Those segments in the 3 sectors are referred to as "corresponding channel segments" in the following discussion. Note that because of the full synchronization between the sectors, inter-sector interference is concentrated between corresponding channel segments. Other channel segments normally see little or negligible inter-sector interference between each other.

Figure 11:
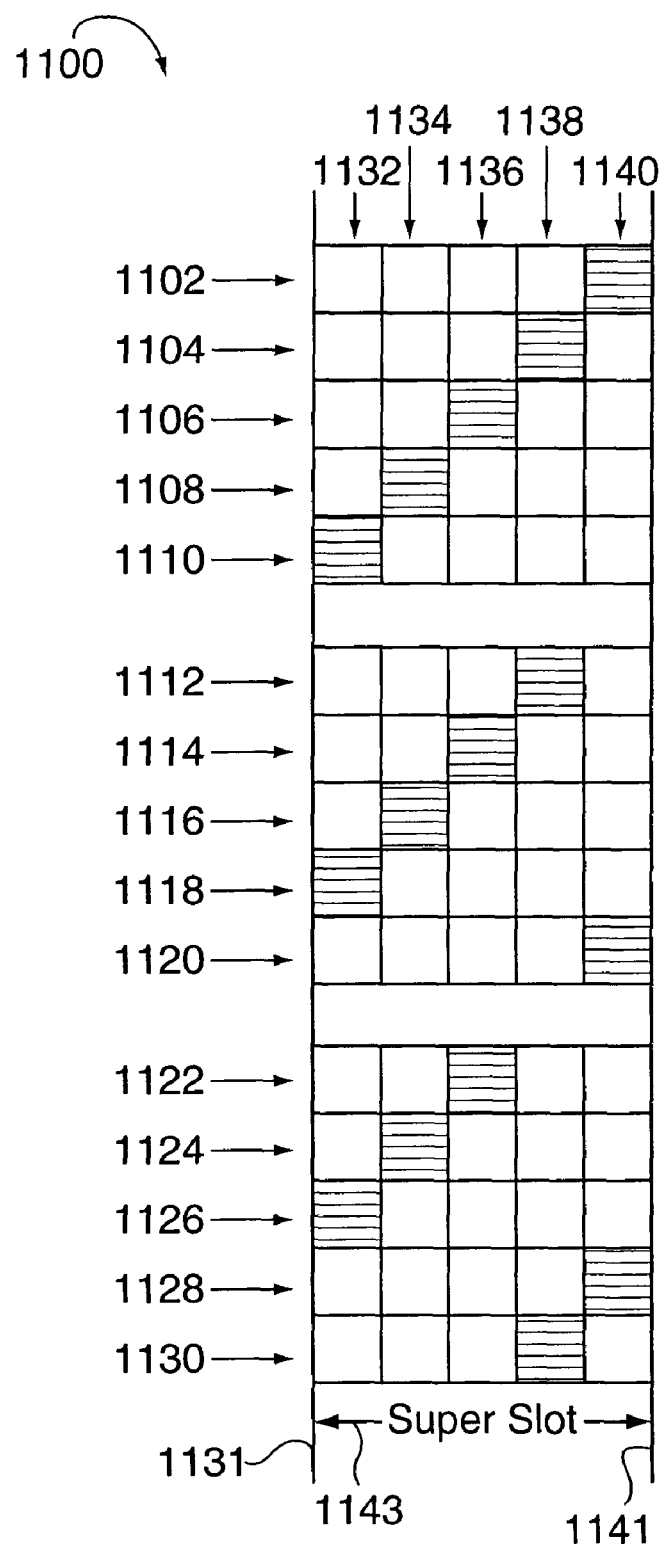
FIG. 11 illustrates exemplary pilot tone hopping sequences with the same slope value but a different offset value in each sector of a cell in accordance with the present invention.

FIG. 11 shows a frequency vs time graph 1100 to illustrate pilot tone hopping sequences in the 3 sectors.

First through fifteenth rows 1102, 1104, 1106, 1108, 1110, 1112, 1114, 1116, 1118, 1120, 1122, 1124, 1126, 1128, 1130 of FIG. 11 correspond to the same frequency tones as rows 902, 904, 906, 908, 910, 912, 914, 916, 918, 920, 922, 924, 926, 928, 930 of FIG. 9, respectively. First though fifth columns 1132, 1134, 1136, 1138, 1140 of FIG. 11 correspond to the same OFDM symbol times of first through fifth column 932, 934, 936, 938, and 940 of FIG. 9, respectively. A super slot 1143 defined by boundary lines 1131 and 1141 of FIG. 11, corresponds to the super slot 943 of FIG. 9.

The pilot tone hopping sequences are indicated by horizontal line shading in FIG. 11. Not all the pilot tone hopping sequences used in each individual sector of a cell are the same to facilitate, among other things, sector identification of a mobile node. Thus, in FIG. 11 the pilot tone hopping sequences are shown to be different in each sector of the three sector cell. FIG. 11 illustrates the pilots by horizontal shading in the 3 sectors in a cell where no pilots overlap.

In accordance with the invention, the pilots used in each of the exemplary cell's sectors have the same value of SLOPE, but different sets of offsets $\{O_j\}$. These known offsets may be included in the pilot value information 562 stored in the base station and/or the mobile node pilot value offset information 648. In the example, in the 3-sector cell, sector 1 uses offsets $\{O_{j,1}\}$, sector 2 uses offsets $\{O_{j,2}\}$, and sector 3 uses offsets $\{O_{j,3}\}$. The offset sets $\{$and $\{O_{j,3}\}$ are not identical resulting in different frequencies being used for pilots in different sectors at the same time. In one embodiment, the offset sets are completely non-overlapping, that is, no two elements in the offset sets are identical. Hence, the pilots in different sectors do not interfere with each other. In another embodiment, $\{O_{j,2}\}$ and $\{O_{j,3}\}$ are derived from $\{O_{j,1}\}$: $O_{j,2}=O_{j,1}+D_2$ mod N, and $O_{j,3}=O_{j,1}+D_3$ mod N, for all j, where $D_2$ and $D_3$ are two non-zero constants determined by the sector indices.

In accordance with the invention, the pilot hopping sequences and data hopping sequences multiplex. That is, at a given OFDM symbol time, if one pilot sequence occupies the same tone as another data sequence, then the tone is used by the pilot sequence to the exclusion of the data that would have been transmitted on the tone. Effectively, the data sequence is punctured at that OFDM symbol time. The punctured, e.g., omitted, data may be recovered from the transmitted data using error correction codes and error correction techniques.

Figure 12:
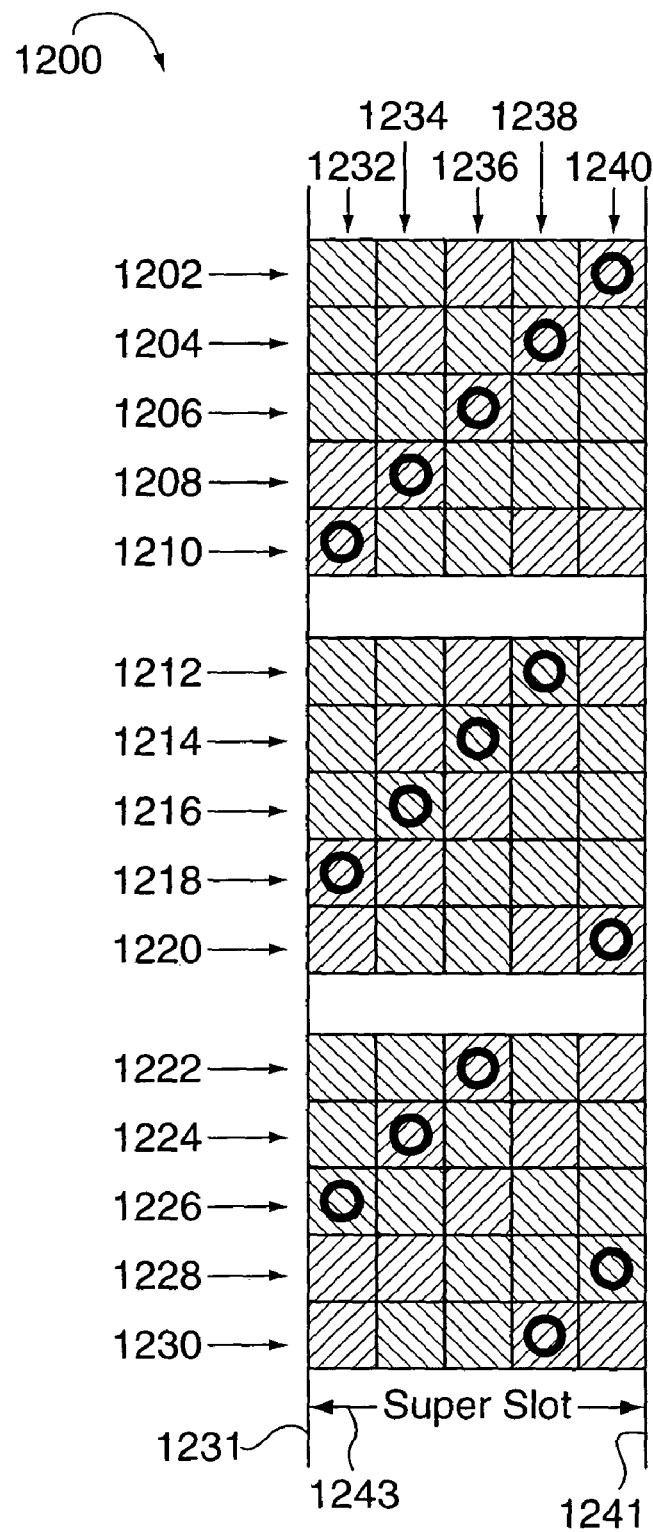
FIG. 12 illustrates the concept of the pilot tone hopping sequence of FIG. 11 puncturing the data sequence of FIG. 10 in accordance with the present invention.

FIG. 12 shows a frequency vs time graph 1200, which is a combination or overlay of FIGS. 10 and 11 and is used to illustrate the data/control sequences of FIG. 10 being punctured by the pilot sequence of FIG. 11. Each row corresponds to one frequency with each horizontal section corresponding to a different symbol transmission time.

First through fifteenth rows 1202, 1204, 1206, 1208, 1210, 1212, 1214, 1216, 1218, 1220, 1222, 1224, 1226, 1228, 1230 of FIG. 12 correspond to the same frequency tones as rows 902, 904, 908, 910, 916, 918, 920, 922, 924, 926, 928, 930 of FIG. 9, respectively. First though fifth columns 1232, 1234, 1236, 1238, 1240 of FIG. 12 correspond to the same OFDM symbol times of first through fifth column 932, 934, 936, 938, and 940 of FIG. 9, respectively. A super slot 1243 defined by boundary lines 1231 and 1241 of FIG. 12, corresponds to the super slot 943 of FIG. 9.

Line shading descending from left to right is used to indicate segments corresponding to a first data or control channel. Line shading ascending from left to right indictes segments corresponding to a second data or control corresponding channel. Circles on top of the data/control channel segments represent pilot tones punching through the data/control sequences to the exclusion of the data which would have been transmitted in the segment.

When the sectorized OFDM spread spectrum system is used in a cellular network, in accordance with the invention, neighboring cells use different values of SLOPE to determine the pilot and data tone hopping sequences. In the exemplary system of the invention, the offset sets $\{O_{j,1}\}$, $\{O_{j,2}\}$, and $\{O_{j,3}\}$ are the same in each of the system's numerous cells. Different cells need not, and often are not, synchronized in terms of tone frequencies, OFDM symbol timing, tone hopping sequences, channel segments or super slot boundaries even though within an individual cell sectors may have such features/characteristics in common.

Power allocation across sectors of a cell and within a sector in accordance with various features of the invention will now be described.

The fact that inter-sector interference mainly occurs between corresponding channel segments imposes a constraint on the power allocation across corresponding channel segments in the sectors of a cell.

For the sake of description, first suppose that corresponding channel segments are all active, i.e., being used to transmit signals. In accordance with a feature of the invention, the transmission power allocated to corresponding channel segments are substantially the same in each sector of a cell. For example, in the 3-sector system, if all 3 corresponding channel segments are active, then the difference between the transmission powers for those channel segments in the 3 sectors shall be no more than a parameter, Delta. The scheduler 534 of FIG. 5, in the exemplary embodiment, is responsible for coordinating the power allocation in each of the cell's sectors in a centralized manner.

The value of Delta, which may be stored in the base station as Delta information 564, affects the potential impact due to the inter-sector interference. For example, for a large Delta, the transmission powers of two corresponding channel segments may be quite different. Consequently, the inter-sector interference may cause large interference on one of the two corresponding channel segments that has smaller transmission power. In one embodiment of the invention, Delta 564 is set to be a constant, for example, zero. In another embodiment of the invention, Delta 564 may vary. Indeed, in accordance with the invention, the value of Delta 564 may be different from one group of corresponding channel segments to another. For example, Delta for corresponding control channel segments may be, and sometimes is, different from that for corresponding data traffic channel segments reflecting, from a policy perspective, tolerance for different levels of interference on different channels. In one embodiment of the invention, Delta is a function of burst data rates used in corresponding channel segments. For example, consider corresponding traffic channel segments. If one of the segments uses high channel coding and modulation rate, for example to support high burst data rate, a small value of Delta is desirable and, in accordance with the invention, used. As part of its function, the scheduler 534 determines the appropriate value of Delta 564 when the scheduler 534 coordinates the power allocation and burst data rate allocation in the sectors of a cell.

In accordance with the invention, the scheduler 534, including routine 542 of FIG. 5, can independently pick wireless terminals to be scheduled in corresponding data traffic channel segments of the cell's sectors. The achieved burst data rates depend on the power allocation determined by routine 540 of FIG. 5 and the channel condition of the scheduled wireless terminals, e.g., as indicated by information 568, and thus may be different in different sectors of a cell.

The constraint on the power allocation across corresponding channel segments in the cell's sectors does not impose a similar constraint on the power allocation across different channel segments within a sector. Indeed, in a given sector, different channel segments may be allocated quite different amount of transmission power. For example, consider corresponding traffic channel segments. Suppose there are two traffic channel segments at a given time. The scheduler 534 may assign via routine 542 of FIG. 5 a wireless terminal of bad channel condition to the first traffic channel segment in each of the sectors, and assign a wireless terminal of good channel condition to the second traffic channel segment in each of the sectors. Then, the scheduler 534 can optimally balance the power allocation in the two traffic channel segments. For example, the scheduler 534 allocates via routine 540 a large portion, e.g., 80% or more, of transmission power to the first traffic channel segments to gain service robustness for the bad channel wireless terminals, and a small portion, e.g., 20% or less, of transmission power to the second traffic channel segments to achieve high burst data rate. In accordance with the invention, the dynamic range of the allocated power between the two traffic channel segments in the same sector may be large, e.g., greater than 3 dB relative power difference while the dynamic range of the allocated power across corresponding traffic channel segments in the cell's sectors is limited, e.g., less than 3 dB relative power difference in some embodiments.

Figure 13:
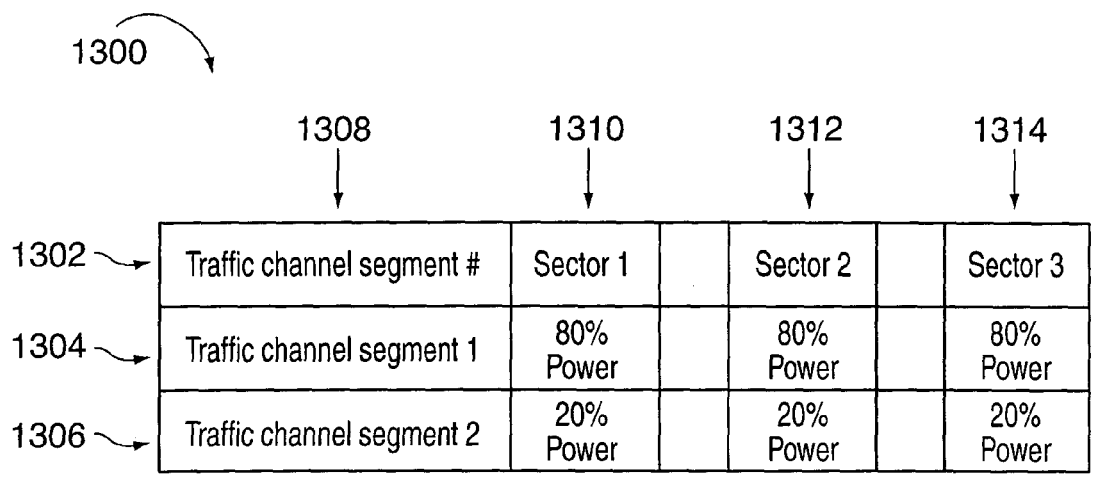
FIG. 13 shows a table illustrating exemplary power allocation between different traffic channel segments in the same sector of a cell and across the corresponding traffic channel segments in all the sectors of a cell in accordance with one embodiment of the present invention.

FIG. 13 illustrates the power allocation between traffic channel segments in the same sector and across corresponding traffic channel segments in multiple sectors of a cell for an exemplary case with two traffic channel segments, and a value of Delta=0. In Table 1300 of FIG. 13, first column 1308 lists the traffic segment number, second column 1310 lists the sector 1 power allocation information, third column 1312 lists the sector 2 power allocation information, and fourth column 1314 lists the sector 3 power allocation information. First row 1302 of table 1300 lists column header information. Second row 1304 lists traffic channel 1 power allocation information across the three sectors. Third row 1306 lists traffic channel 2 power allocation information across the three sectors. In the example, Delta=0, i.e., the allocation to corresponding channels in each sector of the cell is the same while the difference in allocation of power between channels is large, e.g., a difference being a factor of 4.

Consider the following exemplary embodiment of the invention including 2 adjacent sectors, including 2 channels in each sector, and with base station transmit power control on each channel within each sector of the cell in accordance with the invention.

| CELL | |
|---|---|
| SECTOR 1 (S1) | SECTOR 2 (S2) |
| CHANNEL 1 (C1) | CHANNEL 1 (C1) |
| SECTOR 1 POWER | SECTOR 2 POWER |
| CHANNEL 1 (S1PC1) | CHANNEL 1 (S2PC1) |
| CHANNEL 2 (C2) | CHANNEL 2 (C2) |
| SECTOR 1 POWER | SECTOR 1 POWER |
| CHANNEL 2 (S1PC2) | CHANNEL 2 (S1PC2) |

The transmitter may be controlled to operate on a first and second communications channel in a synchronous manner with transmissions made into both first and second sectors.

In the exemplary case, the total transmission power of the tones corresponding to the first channel in the first sector of the cell (S1PC1) is controlled to be greater than 20% and less than 500% of the total power of the tones transmitted in the second sector corresponding to the first channel (S2PC1) during a period of time, e.g., a subset of symbol times. This may be represented by a first channel wide inter-sector transmission power control range: 20%<(S1PC1/S2PC1)<500%.

In some embodiments, controlling the total transmission power of the tones corresponding to the first channel includes limiting the total power used in the first subset of symbol times to no more than a fixed fraction of a maximum average total transmission power used by the transmitter in the first sector during any 1 hour period, the fixed fraction also being used to limit the total transmission power of the tones corresponding to the first channel in the second sector during the first subset of symbol times to be no more than the fixed fraction of a maximum average total transmission power used by the transmitter in the second sector during any 1 hour period, said fixed fraction being less than 100%.

In some embodiments, the total transmission power of the tones corresponding to the first channel in the first sector of the cell (S1PC1) is controlled to be greater than 50% and less than 200% of the total power of the tones transmitted in the second sector corresponding to the first channel (S2PC1) during a period of time, e.g., another subset of symbol times. This can be represented by a first channel narrow inter-sector transmission power control range: 50%<(S1PC1/S2PC1) <200%. The base station may monitor the number of symbols in a constellation being used for an interval of time, and use that information to decide whether to apply the wide inter-sector channel control range or the narrow inter-sector channel control range. With a larger number of symbols in a constellation, e.g., modulation with more elements per set, the channel is more susceptible to interference noise, and therefore, the narrower inter-sector power control range is selected by the base station, allowing the base station to more tightly control the levels of interference between users within sectors, and keep that interference level to an acceptably low level. The base may also make decisions as to whether to use the wide inter-sector power control range or the narrow inter-sector power control range based upon the channel coding rate, e.g., is the coding rate a slower coding rate or a faster coding rate. If a channel is using the faster coding rate for an interval of time, the base station should use the narrower inter-sector transmission power control range, since the faster range will make the user, more susceptible to interference, and interference levels between users can be more tightly controlled and managed by the base station to maintain an acceptable level if the narrower inter-sector transmission power control range is used.

In some embodiments, the interval or period of time, e.g., the subsets of symbol times at which the transmission power control on a particular channel concerning two adjacent sectors uses a tighter inter-sector power control range or a narrower inter-sector power control range, includes at least 14 consecutive symbol times.

In some embodiments, the total transmission power of the tones corresponding to the first channel in the first sector may be equal to the total power of the transmitted tones in the first channel of the second sector during a period of time, e.g. interval of symbol times. This may be described as: S1PC1=S2PC1. FIG. 13 illustrates such a case where the power allocation to traffic segment 1=80% for both sector 1 and sector 2 (second row 1304, column 2 1310 and columns 3 1312).

In some embodiments, within a given sector, e.g., the first sector, the total power of the tones transmitted in the first sector for the first channel (S1PC1) may be greater than 200% or less than 50% of the power of the tones transmitted in the first sector for a second channel (S1PC2) for a period of time. This inter-channel transmission power control range within a sector may be represented by: ((S1PC1/S1PC2) <50%) or (S1PC1/S1PC2>200%). In the example of FIG. 13 such an embodiment is shown, S1PC1=80% (second row 1304, second column 1310) and S1PC2=20% (third row 1306, second column 1310); S1PC1/S1PC2=400%. This allows a wide range of power selections available to the base station to match users to power levels.

The interval of time at which the base station controls the difference in transmission power levels between the two channels within a given sector of a cell at greater than 200% or less than 50% may be a interval of at least 14 consecutive symbol times.

In accordance with the invention, wireless terminals may be identified as being in boundary areas, e.g., sector boundary areas. The allocation of communication resources, e.g., channels, to wireless terminals may be controlled. In accordance with the invention, those resources may include a channel that limits the base station's total transmission power of its tones controlled to be<10% total transmission power of the corresponding tones in the same channel in an adjacent sector to the boundary wireless terminal's sector. Thus, in such a case ratio of base station total transmission power on corresponding tones for the same channel between adjacent sectors would be 10% or less for one sector and 1000% or more for the adjacent sector. In other embodiments, the <10% level may be 0%; effectively no power transmission on same channel in the adjacent boundary sector. These implementation with a channel in one sector allocated little or no power, in accordance with the invention, is useful for operation of wireless terminals in sector boundary regions where high levels of interference would normally be experienced, e.g. regions 315, 317, and 319 of FIG. 3.

The identification and classification of wireless terminals 600 of FIG. 6 to be in boundary areas, e.g., sector boundary regions, and the allocation or resources based upon the identification may be performed by the base station under the control routines 528 including the inter-sector interference routine 536 of FIG. 5, wireless terminal/traffic & segment matching routine 542 of FIG. 5 and power allocation routine 540. The identification of a wireless terminal 600 in a boundary area may be made based upon feedback information obtained from the wireless terminal 600 that the base station 500 receives and processes; the feedback information may include experienced levels of inter-sector interference, background interference and location interference. The wireless terminal 600 may collect MN channel condition info 632 and report such information to the base station 500 under the direction of the channel condition monitoring/reporting routine 628; the information will be available to the base station 500 in the MN channel condition information 568.

Next, consider that corresponding channel segments need not all be active. Note that an inactive segment does not cause inter-sector interference to other corresponding channel segments and is also not affected by the inter-sector interference from other corresponding channel segments. Therefore, in accordance with one embodiment of the invention, when the scheduler 534 coordinates the power allocation in a cell's sectors, only the active segments are taken into account.

If a wireless terminal, e.g., MN 600 of FIG. 6, is located at a sector boundary, e.g., region 315, 317, or 319 of FIG. 3, it may experience a significant amount of inter-sector interference. In one embodiment of the invention, the scheduler 534 uses inter-sector interference routine 536 and matching routine 542, to assign segments of a first traffic channel to a wireless terminal in a sector boundary and the corresponding traffic channel segments to wireless terminals in non-sector boundary areas in the other sectors. In another embodiment of the invention, the scheduler 534 via routines 538 and 542 assigns one traffic channel segment to a sector boundary wireless terminal, and keeps one or more corresponding traffic channel segments inactive in the other sectors, so as to reduce the inter-sector interference. In such a case, frequencies assigned to the wireless terminal in the sector boundary area will not be subjected to interference from adjacent sectors since the tones are left unused in those sectors. In one embodiment, there is a pattern of utilizing a given traffic channel segment, in which a sector periodically keeps the segment inactive while some of the other sectors keep the segment active. The pattern can be fixed such that the sectors do not have to coordinate each other in a real time fashion. For example, one sector (sector A) keeps a traffic segment inactive (i.e., not assign it to any wireless terminal in the sector), while the other two sectors (sectors B and C) assign the segments to the wireless terminals in the sector boundaries between A and B and between A and C. In the subsequent traffic segment, sector B keeps a traffic segment inactive while the other two sectors assign the segments to the wireless terminals in the sector boundaries between B and A and between B and C. Then, in the subsequent traffic segment, sector C keeps a traffic segment inactive while the other two sectors assign the segments to the wireless terminals in the sector boundaries between C and A and between C and B. The whole pattern then repeats, without explicit and real time coordination among the three sectors.

One consequence of full timing and frequency synchronization across sectors of a cell is that it may be difficult for a wireless terminal, e.g. MN 600 of FIG. 6, especially close to the sector boundary, e.g., boundary 446 or 446' of FIG. 4, to figure out which sector 654 of FIG. 6, a received channel segment has come from. In order to differentiate the channel segments across the sectors, distinct scrambling bit sequences may be used in different sectors.

Scrambling is a well-known method to randomize the transmitted signal. There are a number of ways to implement scrambling. Consider below a particular implementation for illustration. It is understood that the principles of the invention do not rely on the particular exemplary implementation. At the transmitter 514 of FIG. 5, at a given OFDM symbol transmission time, symbols from various channel segments, generated by the encoders of individual channel segments, are multiplexed to form a symbol vector, which is then used to generate the OFDM symbol signal to be transmitted. The scrambling bit sequence is a random binary sequence, known to both the transmitter 514 and the receiver 610 of FIG. 6. The symbol vectors are phase-rotated in the exemplary embodiment based on the scrambling bit sequence. At the receiver 610, the same scrambling bit sequence is used to de-rotate the received symbol before decoding takes place.

In accordance with one embodiment of the invention, distinct scrambling bit sequences are used in different sectors and the sector/scrambling information is stored in the mobiles. The base station, 500 of FIG. 5, uses different scrambling bit sequences in the 3 sectors to generate their respective transmit signals. The wireless terminal receiver 610 of FIG. 6 uses the particular scrambling bit sequence, corresponding to the sector in which it is located, to selectively demodulate the signal from an intended sector transmission of the base station 500. Alternatively, the wireless terminal receiver 610 may use multiple scrambling bit sequences to demodulate the signals from multiple sector transmissions of a base station 500 or from multiple base stations simultaneously with the scrambling sequence used corresponding to the one used by the sector which transmitted the signal being recovered.

Channel condition measurement and reporting features of the invention will now be described. In order to facilitate the scheduling for downlink traffic channel segments, such as power allocation and burst data rate allocation, a wireless terminal 600 of FIG. 6 may measure its downlink channel condition under control of routine 628 of FIG. 6 and periodically send the channel condition report including data/info 632/634 of FIG. 6 to the base station 500 of FIG. 5.

The channel condition of a wireless terminal 600 may be in two characteristic regions. For the sake of description, assume that the channel condition is measured in terms of SIR (Signal Interference Ratio). In the first region, e.g., the non-sector boundary region, the SIR is limited by the inter-cell interference or the wireless propagation loss, while the inter-sector interference is a small component. In that case, the base station 500 can increase the received SIR of a traffic channel segment to the wireless terminal 600 by allocating high transmission power under control of routines 538 and 540 of FIG. 5. In the second region, e.g., the inter-sector boundary region, the SIR is mainly limited by the inter-sector interference. In that case, given the constraint on power allocation, e.g., a small Delta between sectors across corresponding data traffic channel segments in the cell's sectors, allocating high transmission power does not remarkably increase the received SIR since the power of the interference increases as the power is increased. The above two regions represent the extreme channel condition characteristics. In reality, the channel condition of the wireless terminal 600 may more typically be in-between the two extreme regions which were just described.

In accordance with the invention, the wireless terminal 600 estimates, e.g., measures its channel condition characteristics under control of routine 628 and notifies the base station 500 of the determined channel information. This allows the base station 500 to make sensible scheduling decisions in terms of power and burst data rate allocation. In one embodiment of the invention, data 632,634 shown FIG. 6 is included in a downlink channel condition report sent to the base station. In some implementations, the wireless terminal 600 differentiates the SIR due to inter-sector interference via routine 536 of FIG. 5 and SIR due to other types of impairments such as inter-cell interference via routine 536 of FIG. 5 and provides such information to the base station. This allows the base station to perform power allocation decisions based on inter-sector feedback information and not simply a single interference indicator which makes it difficult to determine if allocating more power will have a desired beneficial result.

Use of a relatively high power tone or tones, referred to here as a beacon signal, will now be described. To facilitate various downlink operations, in accordance with the invention, the base station 500 of FIG. 5 may frequently and/or periodically transmit a beacon signal under control of signal generation routine 532 as a function of information 530 which includes beacon info 548. Each beacon signal is an OFDM signal transmitted over, e.g., during one single symbol transmission period. When a beacon signal is transmitted, most of the transmission power is concentrated on a small number of tones, e.g., one or two tones which comprise the beacon signal. Many or most of the tones which are not used for the beacon signal may, and often are, left unused. The tones which form the beacon may include 80% or more of a maximum average total base station power used by said base station to transmit in a sector during a beacon signal transmission time, which may, e.g., in some embodiments be a symbol time. In some embodiments, some additional tones, may carry signal at the same time as the beacon transmission, and the total power level for those tones is less than or equal to 20% of the maximum average base station power used by the base station to transmit in the sector at the time of beacon transmission.

Figure 14:
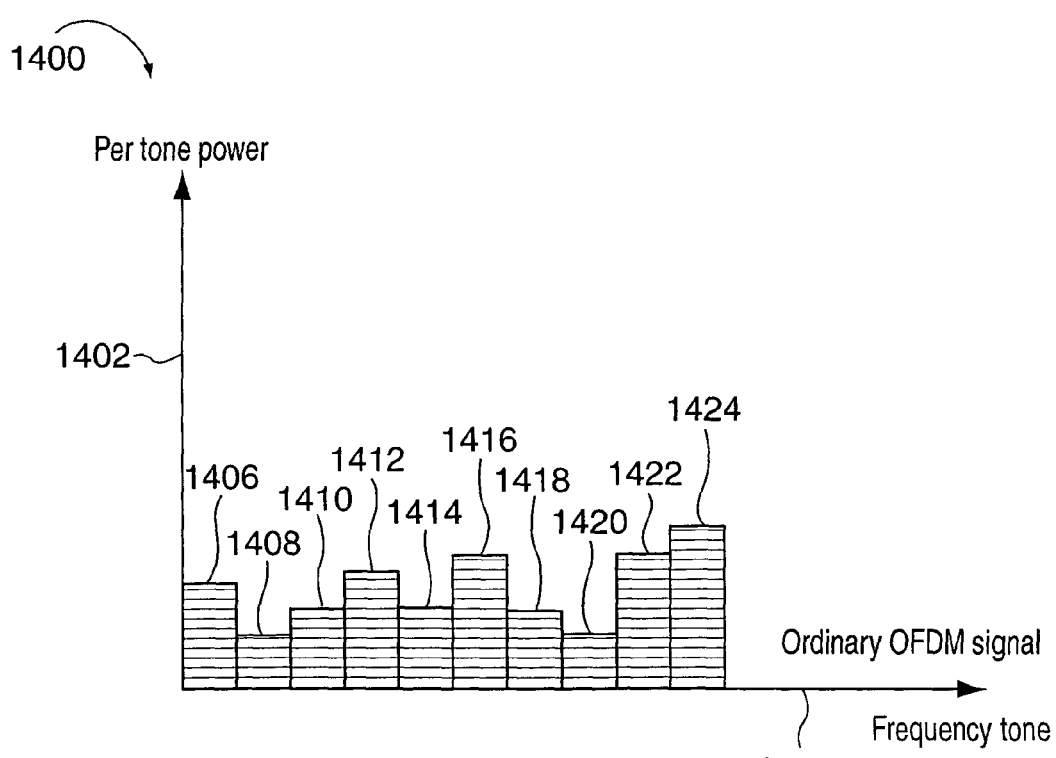
FIG. 14 shows a graph of per tone power vs frequency tone for ordinary OFDM signal.

The graph 1400 of FIG. 14 shows an ordinary OFDM signal. The vertical axis 1402 represents the power allocated to tones while the horizontal axis 1404 corresponds to tone frequency. Individual bars 1406, 1408, 1410, 1412, 1414, 1416, 1418, 1420, 1422, 1424 each correspond to the level of power for each of the distinct exemplary OFDM frequency tones at some instant of time, e.g., the symbol period. It may be seen that the total power is broken up relatively uniformly between the various frequency tones.

Figure 15:
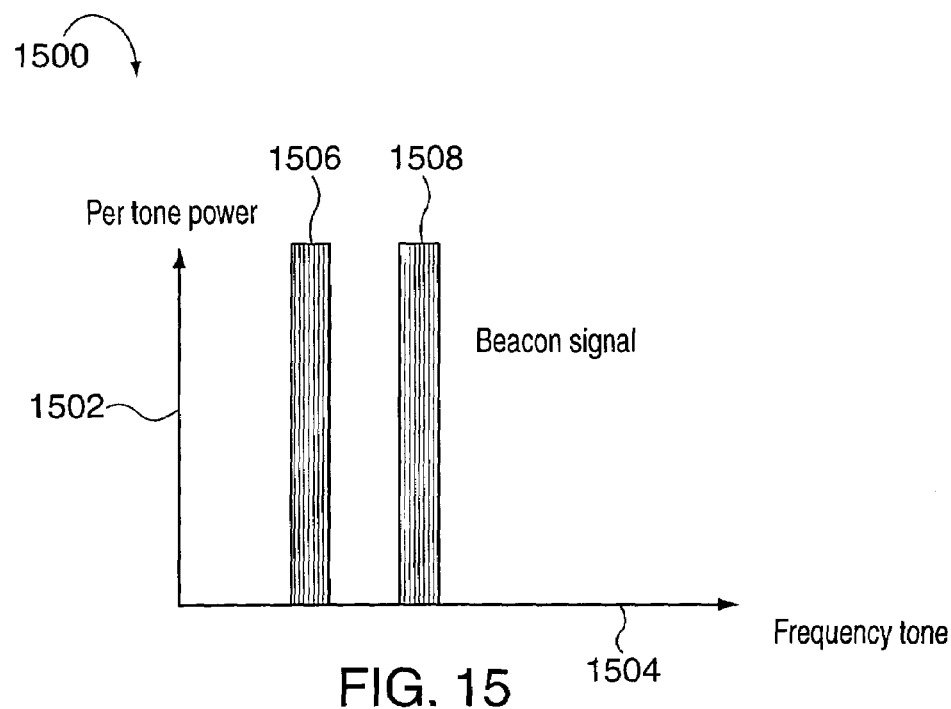
FIG. 15 shows a graph of per tone power vs frequency tone for the time of beacon signal transmission where the total power is concentrated on just two tones in accordance with one implementation of the present invention.

The graph 1500 of FIG. 15 shows an exemplary beacon signal in accordance with one exemplary embodiment of the present invention. The beacon signal includes two tones 1506, 1508. The majority of the sector transmission power is allocated between the two tones 1506, 1508 of the beacon each of which is allocated approximately 45–50% of the total power. The vertical axis 1502 represents per tone power while the horizontal axis 1504 corresponds to tone frequency. In the FIG. 15 example, this results in two tones having approximately the same total power as the tones normally used to transmit data. Individual bars 1506, 1508 correspond to the level of power for each of two selected OFDM frequency tones at the instant of time of beacon transmission. It may be seen that the total power is concentrated on the two selected frequencies at the time of beacon transmission. The significant concentration of sector transmission power in a very limited number of tones differs significantly from conventional pilot tones where the pilots may be transmitted at power levels slightly higher than tones used to transmit data.

Figure 16:
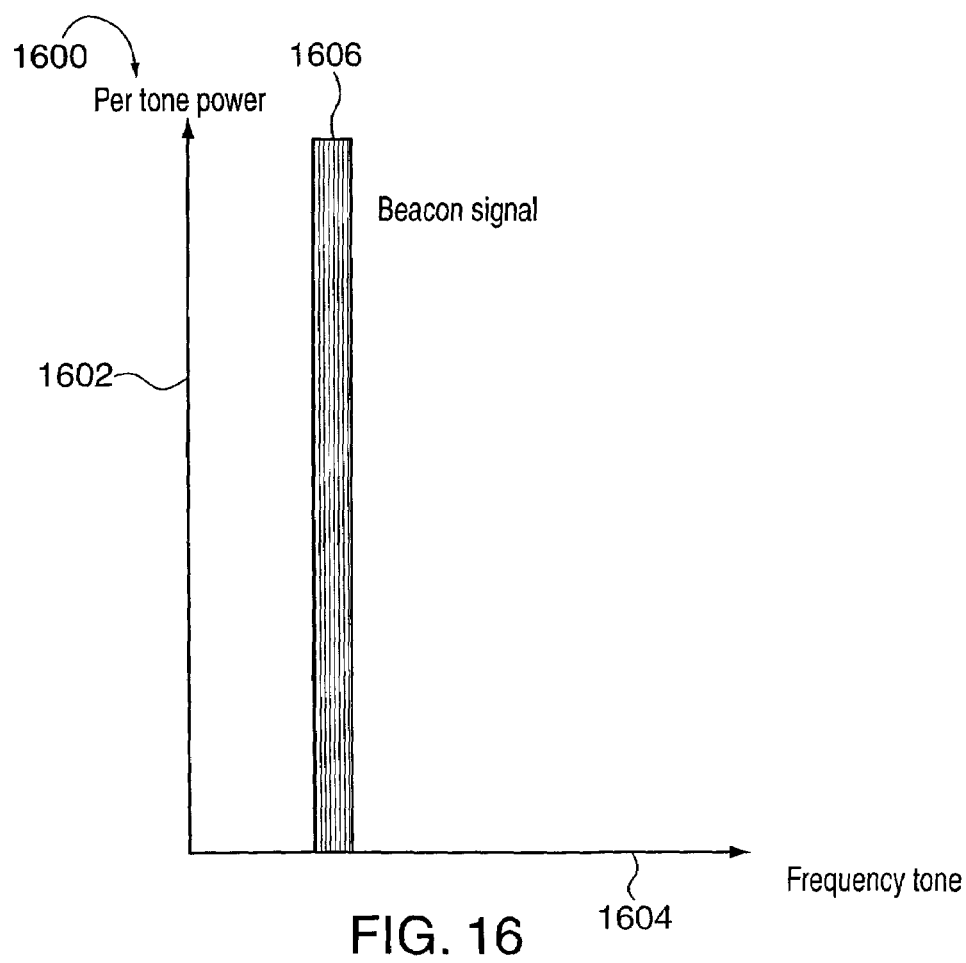
FIG. 16 shows a graph of per tone power vs frequency tone for the time of beacon signal transmission where the total power is concentrated on just one tone in accordance with one implementation of the present invention.

The graph 1600 of FIG. 16 shows an exemplary beacon signal in accordance with another embodiment of the present invention where the total power is allocated primarily to only one single frequency tone which is allocated approximately 90–100% of the total sector transmission power. The vertical axis 1602 represents per tone power while the horizontal axis 1604 represents frequency tone. A single bar 1606 corresponds to the level of power for the single selected OFDM frequency tone used as the beacon signal. It may be seen that the total power is concentrated on the one single frequency tone at the time of beacon transmission resulting in a beacon tone having a power level at least 5 times that of the highest power tone used to transmit data in the sector at other times.

One advantage of this concentration of power in a beacon signal, is the easy and rapid identification of the beacon signal(s) by the mobile nodes, e.g. MN 600 of FIG. 6. This allows for the rapid and/or accurate conveyance of information to the mobiles at the point of time a beacon is transmitted, e.g., super slot boundary synchronization information, slope (cell) information, or sector information. Given the high power of the beacon tones, they are easy to detect with the probability of a data tone being misinterpreted as a beacon tone being relatively low due to the normally large power difference between the beacon tones and data tones.

In one embodiment of the invention, the beacon signal may be transmitted at a fixed OFDM symbol duration, for example, the first or the last OFDM symbol, of a super slot. In this way, a beacon tone can be used to signal superslot boundaries. The beacon signal may repeat every super slot or every few super slots. The beacon signal is easy to detect, as it has extremely high power concentrated on just a few tones. Therefore, once the time position of the beacon signal has been located, the super slot boundaries can be promptly determined with a high degree of certainty.

Figure 17:
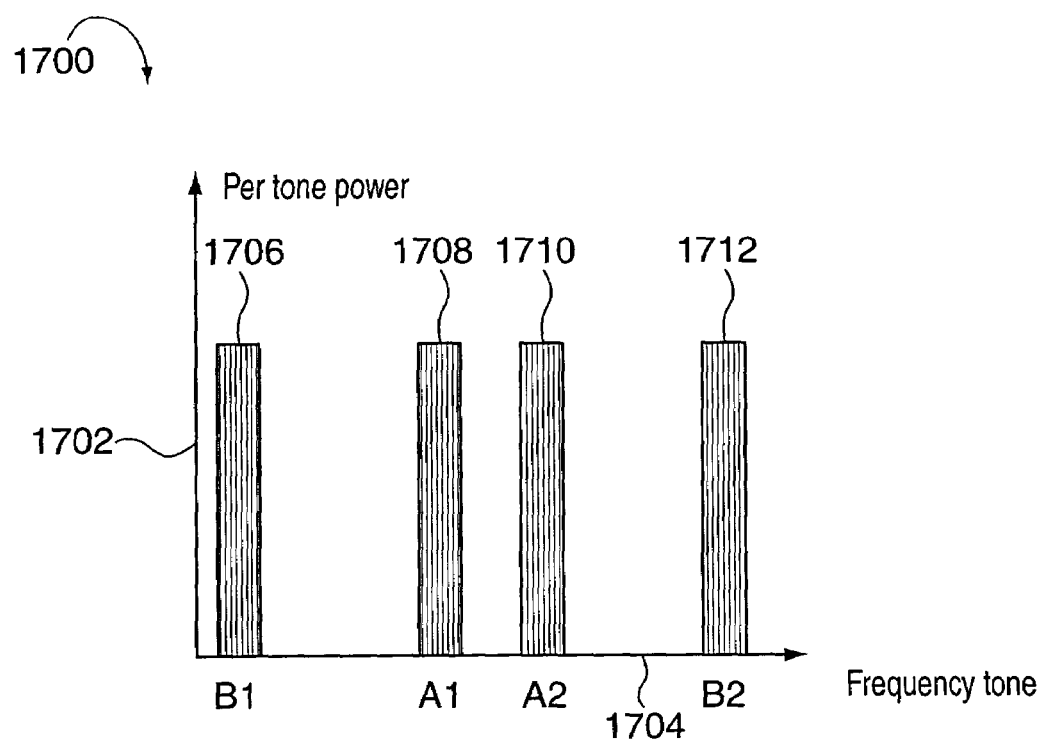
FIG. 17 shows a graph of per tone power vs frequency tone for the time of beacon signal transmission illustrating a predefined group of beacon tone sets in accordance with one embodiment of the present invention.

In another embodiment of the invention, the high power tone or tones used as a beacon signal is selected from a predefined group of beacon tones or tone sets. Tone sets are used where multiple high power tones form a beacon signal may vary with time. The sets of predefined beacon tones may be included as part of the stored beacon information 548 included in the base station of FIG. 5 and the stored beacon information 652 of the wireless terminal. Using different beacon tone sets as the beacon signal can be used to indicate or convey certain system information including sector identification information. For example, the beacon signal may use 4 tones, as shown in FIG. 17. In the graph 1700 of FIG. 17, the vertical axis 1702 represents per tone power, while the horizontal axis 1704 represents frequency. FIG. 17 shows a set of four beacon tones: B1 1706, A1 1708, A2 1710, and B2 1712. The per tone power for each of the beacons 1706, 1708, 1710, 1712 is approximately the same with each beacon tone being allocated approximately 25% of the sectors total transmission power. The frequency location of various beacon tones, e.g., the two inner tones A1 1708 and A2 1710 is used to indicate the value of SLOPE used in the cell. The frequency location of some tones, e.g., the two outer tones B1 1706 and B2 1712 is used to indicate the boundary of the frequency band used in the cell for transmission purposes and/or optionally the sector index. Beacon signals of neighboring cells will have different inner beacon tone frequency location A1 1708 and A2 1710 to indicate different slope values. Thus in a given cell, the beacon signals of different sectors may have different B1 1706 and B2 1712 tone locations. Assuming that the outer beacon tones B1 1706 and B2 1706 are used to indicate frequency boundaries, these may be the same in each sector of a cell assuming the use of the same frequency band in each sector.

Figure 18:
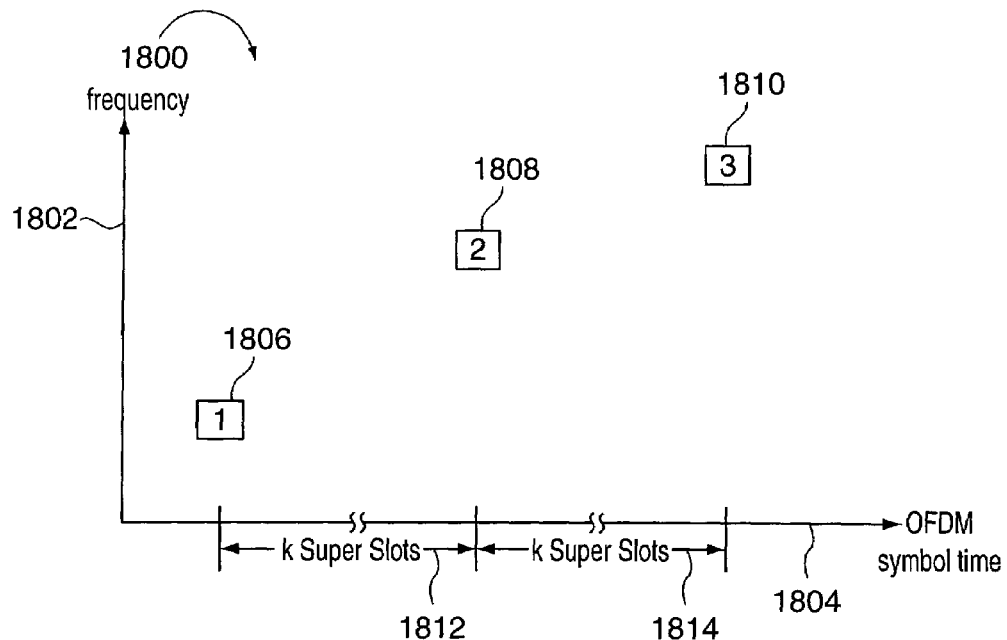
FIG. 18 shows a graph of frequency vs OFDM symbol time illustrating the concept of different functionality for successive beacons in the time domain in accordance with one embodiment of the present invention.

The time at which particular beacon signals are transmitted can be used to indicate more than just slot boundaries. FIG. 18 shows a graph 1800 of frequency vs OFDM symbol time illustrating different possible types of beacons being transmitted in the time domain in accordance with various possible embodiments of the invention. The vertical axis 1802 represents frequency and the horizontal axis 1804 corresponds to OFDM symbol time. Different beacon signals will be described as corresponding to a particular beacon type based on the information it conveys alone or in combination with other beacon signals.

A type 1 beacon signal 1806 is shown to be transmitted at the start of a super slot. After a time interval of k super slots 1812, where k is an integer value, a type 2 beacon 1808 is transmitted. Then k super slots 1814 later, a type 3 beacon 1810 is transmitted. The tone frequencies and/or beacon tone power levels for each of the three beacons 1806, 1808, 1810 are different. The type 1 beacon 1802 may be used to convey frequency floor information indicating a lower frequency boundary of frequency band being used in a sector. The type 2 beacon may be used to provide an index to slope, e.g., slope indicator, from which a wireless terminal can determine the cell's slope. Using the type 2 beacon to determine slope allows a wireless terminal to determine which cell the mobile node is located in. A type 3 beacon 1810 is used to convey sector information (e.g. allow the mobile to identify the sector location 1, 2, 3) via e.g. an index table of sector numbers or pilot offsets corresponding to specific frequency tone values in the same manner a type 2 beacon can be used to convey cell information, e.g., slope information. As discussed above, different base stations may be pre-configured with different values of slope, and different values for pilot offsets in different sectors, which are used to control the hopping sequences within a base station's cell.

Figure 19:
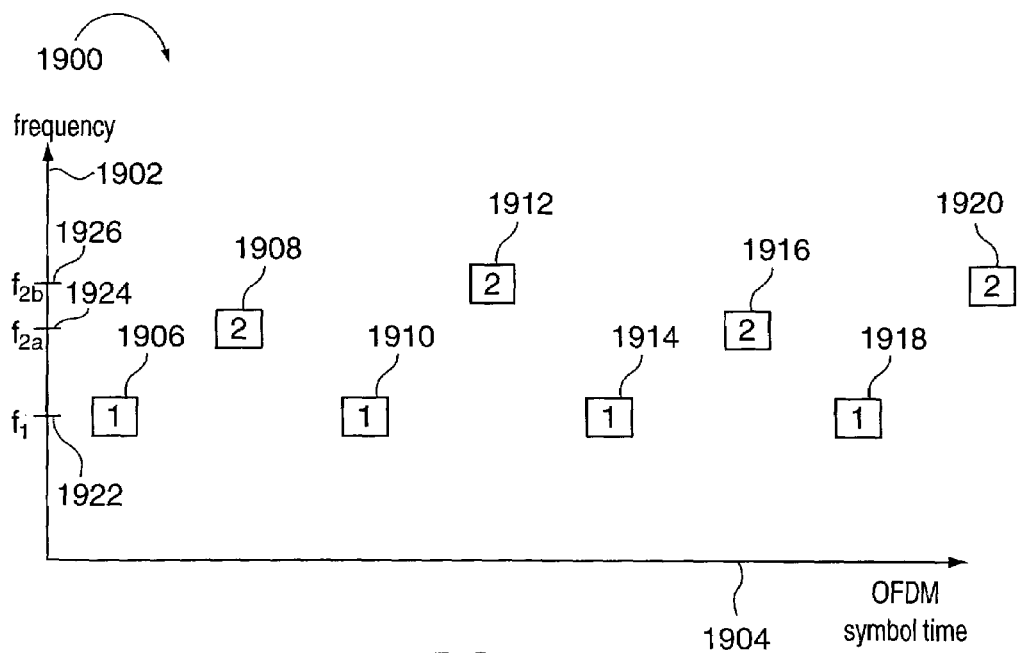
FIG. 19 shows a graph of frequency vs OFDM symbol time illustrating the concept of transmitting alternating beacons types in the time domain in accordance with one embodiment of the present invention.

FIG. 19 shows a graph 1900 of frequency vs OFDM symbol time illustrating the concept of transmitting alternating beacons types in the time domain in accordance with one embodiment of the present invention to convey information. The vertical axis 1902 represents frequency while the horizontal axis 1904 represents OFDM symbol time. In the example shown in FIG. 19, the base station 500 of FIG. 5 transmits alternating beacon types in the following sequence: type 1 beacon 1906, type 2 beacon 1908, type 1 beacon 1910, type 2 beacon 1912, type 1 beacon 1914, type 2 beacon 1916, type 1 beacon 1918, type 2 beacon 1920. All of the type 1 beacons 1906, 1910, 1914, 1918 are transmitted at the same frequency tone $f_1$ 1922. Type 2 beacons 1908 and 1916 are transmitted at frequency tone $f_{2a}$ 1924 while type 2 beacons 1912 and 1920 are transmitted at frequency tone $f_{2b}$ 1926. In the time domain the type 2 beacons switch between the two frequency tones, $f_{2a}$ 1924 and $f_{2b}$ 1926, alternately. The mobile node 600 of FIG. 6 can identify the type one beacons based on beacon tone frequency. The mobile node 600 may be able to process the two distinct type two beacons via an index table which converts each of the tone frequencies to an index number and ultimately to one slope hopping value 646 of FIG. 6 specific to one specific cell 656 of FIG. 6. The mobile node 600 will receive two index numbers, one of which will correspond to the slope index 650. The access node 500 will operate on a fixed number of slope index values with a defined slope indicator equation. Based the mobile's knowledge of that data, the mobile 600 can determine which index 650 corresponds to the slope 646.

As an example, consider that the slope index range is $0 \geq X_S \geq 79$ and that the slope indicator equation is $(X_S+39)$ Mod 80. $X_S$ represents the index to slope for the access node 500. The access node 500 when it transmits the type 2 beacon, alternates between the tone frequencies corresponding to $X_S$ and $(X_S+39)$ Mod 80. In an exemplary case with a value of slope index=50, the exemplary access node transmits type 2 beacons for index values: 50 and 9. The mobile node 600 may receive the index 50 beacon followed by the index 9 beacon or the index 9 beacon followed by the index 50 beacon, depending upon the time that the mobile 600 first detected the type 2 beacon signal. In order for the mobile 600 to determine which is the Xs or slope index (first beacon), the mobile 600 uses the known information that the second beacon's index will be 39 index counts from the $X_S$. If the mobile 600 first receives 9 and then 50, the change in index counts is 41; therefore, the second received index value 50 is the real value to be used for slope index 650. If the mobile 600 first receives 50 and then 9, the change in index counts is 39, therefore, the first received index value 50 is the real value to be used for slope index 650.

By using an index to slope or slope indicator, diversity in frequency is provided allowing reconfiguration in case of failures on a specific tone frequency.

The beacon may also be useful in identifying the cell and sector location (656 and 654 of FIG. 6), and potentially more precise location within the sector, of the mobile 600 receiving the beacon signal(s) and thus be useful to provide warnings of hand-offs and improve the efficiency in handoff operations. Also, by taking over some of the functions sometimes performed by the use of pilot hopping sequences and transmitted pilot signals, such as synchronization to super slot boundaries, the number of pilots and/or pilot power can be reduced. Thus the time of pilot data punch through may be reduced and there may also be a saving in power required to transmit and process pilots.

Various base station signaling, at different strength levels on a per tone basis and different repetition rates, of the present invention will be described and discussed, as used in an exemplary frequency division multiplexed communications system, e.g., an OFDM system. Four signals shall be described, first signals which may include ordinary OFDM signal as in FIG. 14, a second signal with high power levels, e.g., a beacon signal as in FIG. 15, a third signal which include signal having ordinary OFDM signals power levels which may include, e.g, user data, or if occurring concurrently with a beacon may have power levels using the power remaining after beacon allocation, and a fourth signal, e.g., another beacon signal as in FIG. 16 with high power levels comparable with the second signal. The base station transmitter 514 of FIG. 5 uses a set of N tones, e.g. included in tone info 550 of FIG. 5, where N is larger than 10, to communicate information using first signals over a first period of time at least two seconds long and in some embodiments the first period of time is at least 30 minutes. The first signals may include, e.g., user data on traffic channels and may be transmitted using data tone hopping sequences 554 of FIG. 5. A second signal, sometimes referred to as a beacon signal, may be transmitted during a second period of time, where the beacon signal includes a set of X tones, included in tone info 550 where X is less than 5, and where at least 80% of a maximum average total base station transmission power used by the base station during any 1 second time period during the first period of time, is allocated to the set of X tones forming the beacon signal. In some embodiments, the second period of time, used to transmit the second (beacon) signal, may be, e.g., the period of time used to transmit an OFDM symbol 552 of FIG. 5. In some embodiments, the second period, e.g., beacon time period, repeats periodically during the first period. Some of the X tones (beacon) may be at predetermined fixed frequencies; such fixed frequencies, (see FIG. 17), may be used to convey information such as sector location. Some of the X tones (beacon) may have a fixed frequency offset $\geq 0$ from the lowest frequency tone in the set of tones N; in this way the second signal (beacon signal) can be used to convey frequency boundary information to the wireless terminal 600. Some of the X tones (beacon) may be transmitted at a frequency which is determined as a function of at least one of a base station identifier and a sector identifier. This may allow a wireless terminal to rapidly identify the cell and sector that it is operating in, quickly obtain the data and pilot hopping sequences, and quickly synchronize with the base station. In some embodiments, the number of X in the second (beacon) signal is one (see FIG. 16) or two (see FIG. 16). Thus the base station's second (beacon) signal, transmitted with relatively high power and with energy concentrated in one or a few tones, is easily detectable by wireless terminals. In some embodiments, at least half of the N-X tones in the set of N tones but not in the set of X tones go unused during the period of the beacon transmission. In other embodiments, none of the N-X tones in the set of N tones but not in the set of X tones are used during the beacon transmission time. By restricting transmission of non-X (beacon) tones during the second signal (beacon tone interval), the level of the second (beacon) signal can be increased, and confusion with other signaling may be reduced, providing better detection and identification of the beacon signal by wireless terminals.

Third signal may also be transmitted over a third interval of time. The third signal may include a set of Y tones included in tone frequency info 550, where $Y \leq N$, with each tone in third set of Y tones having 20% or less of said maximum average base station transmission power used by base station transmitter during any 1 second period during the first period of time. The third period of time may have the same duration as the second period of time, e.g., occur concurrently with a beacon signal. In some embodiments at least two of data, control and pilot signals may be modulated on at least some of said set of Y tones. In some embodiments, the repetition rate of the set of Y (third signal) tones is at least 10 times the repetition rate of the set of X (second or beacon signal) tones, while in other embodiments, the repetition rate of the set of Y (third signal) tones is at least 400 times the repetition rate of the set of X (second or beacon signal) tones.

A fourth signal may also be transmitted by the base station 500 during a fourth period of time. The fourth signal includes G tones included in tone frequency info 550 of FIG. 5, where G is less than 5 and where at least 80% of the maximum average total base station power used by the base station during any 1 second period during the first period of time is allocated to the G tones. At least one of the G tones is not in the set of X tones (second signal tone set) and the frequency of at least one of the G tones is a function of at least one of a base station identifier and a sector identifier. The fourth signal may also repeat periodically during the first time interval. The fourth signal may be viewed as a second beacon signal being transmitted at a different time than the second signal and conveying different information.

Beacon signals, are structured, in accordance with the invention, to concentrate a relatively high level of power in a small number of tones. During the time of beacon transmission the non-beacon tones may carry no information or in some instances, some of the non-beacon tones may carry signal but at a level significantly below the beacon tone levels. The beacon tones by their characteristics are easy to detect and can quickly convey information, e.g., cell and/or sector information, frequency boundary information, and/or synchronization information to wireless terminals.

Uplink issues will now be described. In accordance with the invention, the frequency, symbol timing, and super slot structures of the uplink signal generated by a wireless terminal may be slaved to those of the downlink signal. Having full synchronization of the downlink signal in each of the sectors, tone frequencies, OFDM symbol timing, and super slot boundaries synchronized to the uplink signal in each of a cell's sectors will insure similar synchronization in the uplink where the uplink is slaved to the downlink.

In one preferred embodiment of the invention, the data tone hopping sequences and channel segments are synchronized across the sectors of a cell. In that case, inter-sector interference is concentrated between corresponding channel segments.

In another embodiment of the invention, the data tone hopping sequences are determined as a function of both the SLOPE parameter and sector index. In that case, there is no notion of corresponding channel segments. A channel segment in one sector may interfere with multiple channel segments in another sector of the same cell.

The present invention may be implemented in hardware and/or software. For example, some aspects of the invention may be implemented as processor executed program instructions. Alternatively, or in addition, some aspects of the present invention may be implemented as integrated circuits, such as ASICs for example. Control means for controlling one or more transmitters may, and in various embodiments are implemented as software modules of a control routine. The apparatus of the present invention are directed to software, hardware and/or a combination of software and hardware. Machine readable medium including instructions used to control a machine to implement one or more method steps in accordance with the invention are contemplated and to be considered within the scope of some embodiments of the invention.

What is claimed is:

1. A method of operating a base station transmitter in a frequency division multiplexed communications system the base station transmitter using a set of N tones to communicate information over a first period of time using first signals, said first period of time being at least two seconds long, where N is larger than 10, a plurality of tones in said set of N tones being used in parallel to communicate information for at least a portion of said first period of time; the method comprising:

transmitting during a second period of time a second signal including a set of X tones, the X tones in said set of X tones being used at the same time during said second period of time, where X is less than 5, and where at least 80% of a maximum average total base station transmission power used by said base station transmitter during any 1 second period which occurs during said first period of time, is allocated to said set of X tones during said second period of time.

2. The method of claim 1, wherein said first period of time is at least 30 minutes.

3. The method of claim 1, where X is equal to one.

4. The method of claim 1, wherein at least half of the N-X tones which are in said set of N tones but not in said set of X tones go unused during said second period of time, said second period of time being a symbol transmission time period.

5. The method of claim 4, wherein none of the N-X tones in said set of N tones but not in said set of X tones are used during said second period of time.

6. The method of claim 4, wherein multiple ones of the N-X tones in said set of N tones but not in said set of X tones are used during said second period of time.

7. The method of claim 1, wherein said communications system is an orthogonal frequency division multiplexed system and wherein said second period of time is a period of time used to transmit an orthogonal frequency division multiplexed symbol.

8. The method of claim 7, wherein said second period of time periodically repeats during said first period of time.

9. A method of operating a base station transmitter in an orthogonal frequency division multiplexed communications system the base station transmitter using a set of N tones to communicate information over a first period of time using first signals, said first period of time being at least two seconds long, where N is larger than 10, the method comprising:

transmitting during a second period of time a second signal including a set of X tones, where X is less than 5, and where at least 80% of a maximum average total base station transmission power used by said base station transmitter during any 1 second period during said first period of time is allocated to said set of X tones during said second period of time, said second period of time being a period of time used to transmit an orthogonal frequency division multiplexed symbol; and transmitting during a third period of time a third signal including a set of Y tones, where $Y \leq N$, each tone in said third set of Y tones having 20% or less of said maximum average total base station transmission power used by said base station transmitter during any 1 second period during said first period of time, said third period of time having the same duration as said second period of time.

10. The method claim 9, wherein said third period of time and said second period of time overlap, the method further comprising:
modulating at least two of data, control and pilot signals on at least some of said set of Y tones.

11. The method of claim 9, wherein said third period, of time and said second period of time are disjoint, the method further comprising:
modulating at least two of data, control arid pilot signals on at least some of said set of Y tones.

12. The method of claim 7,
wherein at least one of said X tones is transmitted at predetermined fixed frequency; and
wherein said at least one of said X tones is transmitted using a frequency having a fixed frequency offset$\geq 0$ from the lowest frequency tone in said set of N tones.

13. The method of claim 7, wherein at least one of said X tones is transmitted at a frequency which is determined as a function of at least one of a base station identifier and a sector identifier.

14. The method of claim 9, wherein for each repetition of said second period of time in said first period of time there are at least Z repetitions of said third period of time in said first period of time where Z is at least 10.

15. The method of claim 14, wherein Z is at least 400.

16. A method of operating a base station transmitter in an orthogonal frequency division multiplexed communications system the base station transmitter using a set of N tones to communicate information over a first period of time using first signals, said first period of time being at least two seconds long, where N is larger than 10, the method comprising:
transmitting during a second period of time a second signal including a set of X tones, where X is less than 5, and where at least 80% of a maximum average total base station transmission power used by said base station transmitter during any 1 second period during said first period of time is allocated to said set of X tones during said second period of time, said second period of time being a period of time used to transmit an orthogonal frequency division multiplexed symbol; and
transmitting during a third period of time a third signal including G tones, where G is less than 5, and where at least 80% of said maximum average total base station transmitter power used by said base station transmitter during any 1 second period during said first period of time is allocated to said G tones.

17. The method of claim 16,
wherein the frequency of at least one of said G tones is a function of at least one of a base station identifier and a sector identifier, and
wherein said at least one of said G tones is not one of said set of X tones.

18. The method of claim 17, wherein said second and third periods of time periodically repeat during said first period of time.

19. A base station for use in a frequency division multiplexed communications system the base station, the base station comprising:
a transmitter that uses a set of N tones to communicate information;
first control means coupled to said transmitter, for controlling the transmitter to transmit over a first period of time using first signals, said first period of time being at least two seconds long, where N is larger than 10 and where a plurality of said N tones are used in parallel during at least a portion of said first period of time; and
second control means coupled to said transmitter for controlling the transmitter to transmit during a second period of time a second signal including a set of X tones which are transmitted at the same time, where X is less than 5, and where at least 80% of a maximum average total base station transmission power used by said base station transmitter during any 1 second period during said first period of time is allocated to said set of X tones.

20. The base station of claim 19, wherein said first period of time is at least 30 minutes.

21. The base station of claim 19, wherein the first and second control means are different, portion of a control routine; and
where X is equal to one.

22. The base station of claim 19, wherein at least half of the N-X tones which are in said set of N tones but not in said set of X tones go unused during said second period of time.

23. The base station of claim 22, where none of the N-X tones in said set of N tones but not in said set of X tones are used during said second period of time.

24. The base station of claim 22, wherein multiple ones of the N-X tones is said set of N tones but not in said set of X tones are used during said second period of time.

25. The base station of claim 19, wherein said communications system is an orthogonal frequency division multiplexed system and wherein said second period of time is a period of time used to transmit an orthogonal frequency division multiplexed symbol.

26. The base station of claim 25, wherein said second period of time periodically repeats during said first period of time.

27. A base station for use in an orthogonal frequency division multiplexed communications system the base station, the base station comprising:
a transmitter that uses a set of N tones to communicate information:
first control means coupled to said transmitter, for controlling the transmitter to transmitter over a first period of time using first signals, said first period of time being at least two seconds long, where N is larger than 10; and
second control means coupled to said transmitter for controlling the transmitter to transmit during a second period of time a second signal including a set of X tones, where X is less than 5, and where at least 80% of a maximum average total base station transmission power used by said base station transmitter during any 1 second period during said first period of time is allocated to said set of X tones, said second period of dine being a period of time used to transmit an orthogonal frequency division multiplexed symbol; and
third control means for controlling the transmitter to transmit during a third period of time a third signal including a set of Y tones, where $Y \leq N$, each tone in said third set of Y tones having 20% or less of said maximum average total base station transmission power used by said base station transmitter during any 1 second period during said first period of time, said third period of time having the same duration as said second period of time.

28. The method of claim 27, wherein said third period of time and said second period of time are disjoint, the method further comprising:
modulating at least two of data, control and pilot signals on at least some of said set of Y tones.

29. The method of claim 25, wherein at least one of said X tones is transmitted at predetermined fixed frequency.

30. A base station for use in an orthogonal frequency division multiplexed communications system the base station, the base station comprising:
a transmitter that uses a set of N tones to communicate information;
first control means coupled to said transmitter, for controlling the transmitter to transmit over a first period of time using first signals, said first period of time being at least two seconds long, where N is larger than 10; and
second control means coupled to said transmitter for controlling the transmitter to transmit during a second period of time a second signal including a set of X tones, where X is less than 5, and where at least 80% of a maximum average total base station transmission power used by said base station transmitter during any 1 second period during said first period of time is allocated to said set of X tones, said second period of time being a period of time used to transmit an orthogonal frequency division multiplexed symbol; and
third control means for controlling the transmitter to transmit during a third period of time a fourth signal including G tones, where G is less than 5, and where at least 80% of said maximum average total base station transmitter power used by said base station transmitter during any 1 second period during said first period of time is allocated to said G tones.

31. The method of claim 30,
wherein the frequency of at least one of said G tones is a function of at least one of a base station identifier arid a sector identifier, and
wherein said at least one of said G tones is not one of said set of X tones.

32. The method of claim 30, wherein said second and third periods of time periodically repeat during said first period of time.

33. A method of operating a base station transmitter in an orthogonal frequency division multiplexed communications system, the method comprising:
operating the transmitter to transmit information using at least N tones in parallel during multiple symbol transmission time periods which occur during a first period of time, where N is larger than 10;
transmitting during second signal transmission time periods which occur on a periodic recurring basis during said first period of time, a signal including up to X tones, where X is less than 5, each of said second period of time being a symbol transmission time period long, and where at least 80% of the transmitter power used to transmit signals during each particular second period of time is allocated between said X tones which are transmitted during the particular second period of time, at least some of said N tones being intentionally left unused during each second period of time, the number of tones being intentionally left unused during each second period of time being greater than X, each of said X tones on which a signal is transmitted during a particular second period of time being allocated more signal transmission power during said particular second period of time than any tone which is not one of said X tones.

34. The method of claim 33, wherein at most 20% of the total transmission power used to transmit signals during each particular second signal time period is allocated to tones which are not included in the X tones used during the particular time period.

35. The method of claim 33, wherein the majority of said N tones go intentionally unused during each of said second transmission time periods.

36. The method of claim 34, wherein the number of said second time periods which occur in said first time period are a minority of the symbol transmission time periods which occur during said first time period.

37. The method of claim 33 were X is one.

* * * * *